(12) United States Patent
Mitsui et al.

(10) Patent No.: US 9,064,182 B2
(45) Date of Patent: Jun. 23, 2015

(54) IMAGE RECOGNITION DEVICE, IMAGE RECOGNITION METHOD, AND IMAGE RECOGNITION PROGRAM

(71) Applicant: Honda elesys Co., Ltd., Yokohama-shi, Kanagawa-ken (JP)

(72) Inventors: Tomokazu Mitsui, Yokohama (JP); Hiroyuki Akimoto, Yokohama (JP); Junji Kanamoto, Yokohama (JP)

(73) Assignee: Honda Elesys Co., Ltd., Kanagawa (JP)

( * ) Notice: Subject to any disclaimer, the term of this patent is extended or adjusted under 35 U.S.C. 154(b) by 71 days.

(21) Appl. No.: 13/756,398

(22) Filed: Jan. 31, 2013

(65) Prior Publication Data

US 2013/0279745 A1  Oct. 24, 2013

(30) Foreign Application Priority Data

Feb. 1, 2012  (JP) .................................. 2012-020323

(51) Int. Cl.
*G06K 9/46* (2006.01)

(52) U.S. Cl.
CPC ............ *G06K 9/4671* (2013.01); *G06K 9/4614* (2013.01)

(58) Field of Classification Search
CPC .................................................... G06K 9/4671
USPC .......................................................... 382/103
See application file for complete search history.

(56) References Cited

U.S. PATENT DOCUMENTS

| 2010/0086176 | A1* | 4/2010 | Yokono et al. ................. 382/103 |
| 2010/0296706 | A1* | 11/2010 | Kaneda et al. ................. 382/118 |
| 2011/0255743 | A1* | 10/2011 | Guan et al. ..................... 382/103 |

FOREIGN PATENT DOCUMENTS

| JP | 2007-310805 A | 11/2007 |
| JP | 2010-257252 A | 11/2010 |

OTHER PUBLICATIONS

Paul Viola et al., "Rapid Object Detection using a Boosted Cascade of Simple Features", Accepted Conference on Computer Vision and Pattern Recognition, 2001, pp. 1-9.

* cited by examiner

*Primary Examiner* — Stephen R Koziol
*Assistant Examiner* — Delomia Gilliard
(74) *Attorney, Agent, or Firm* — Keating & Bennett, LLP

(57) ABSTRACT

An image recognition device includes an image acquiring unit configured to acquire an image, and an object recognition unit configured to calculate gradient directions and gradient values of intensity of the image acquired by the image acquiring unit, to scan the gradient values of each acquired gradient direction with a window, to calculate a rectangular feature value, and to recognize a target object using a classifier based on the rectangular feature value.

6 Claims, 18 Drawing Sheets

FIG. 6

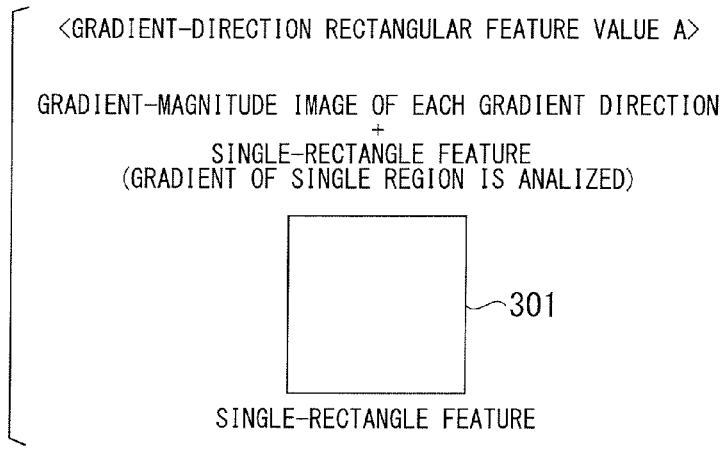

<GRADIENT-DIRECTION RECTANGULAR FEATURE VALUE A>

GRADIENT-MAGNITUDE IMAGE OF EACH GRADIENT DIRECTION
+
SINGLE-RECTANGLE FEATURE
(GRADIENT OF SINGLE REGION IS ANALIZED)

SINGLE-RECTANGLE FEATURE

FIG. 7

<GRADIENT-DIRECTION RECTANGULAR FEATURE VALUE B>

GRADIENT-MAGNITUDE IMAGE OF EACH GRADIENT DIRECTION+HAAR-LIKE
(GRADIENT RELATIONSHIP OF ADJACENT REGIONS IS ANALYZED)

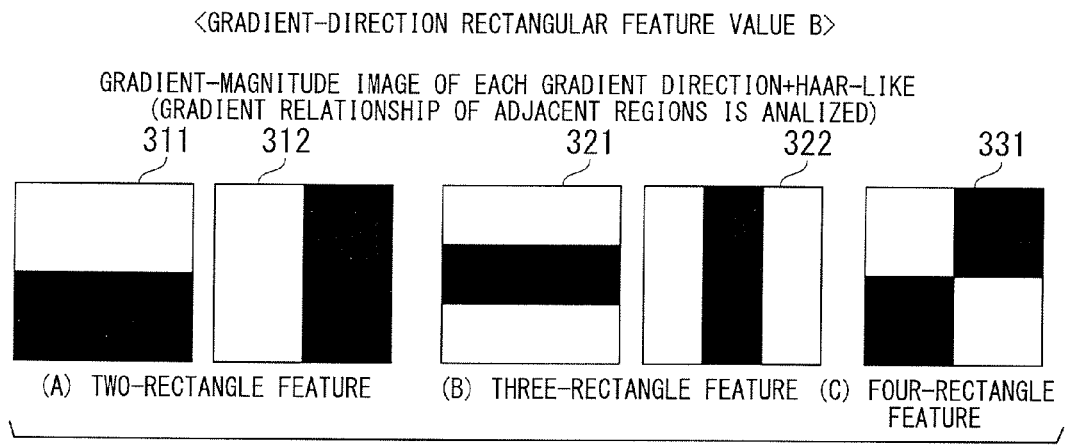

(A) TWO-RECTANGLE FEATURE  (B) THREE-RECTANGLE FEATURE  (C) FOUR-RECTANGLE FEATURE

FIG. 8

<GRADIENT-DIRECTION RECTANGULAR FEATURE VALUE C>

GRADIENT-MAGNITUDE IMAGE OF EACH GRADIENT DIRECTION+HAAR-LIKE APPLICATION
(GRADIENT RELATIONSHIP OF ADJACENT REGIONS IS ANALYZED)

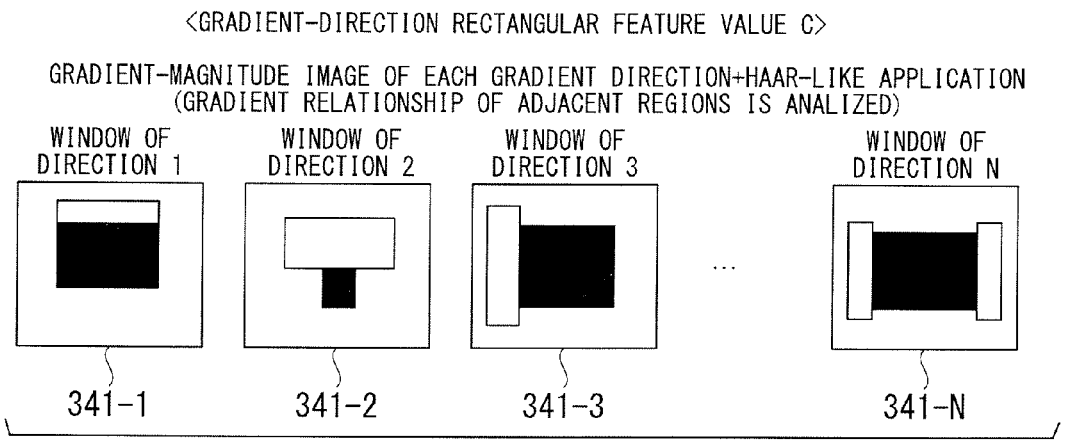

FIG. 17
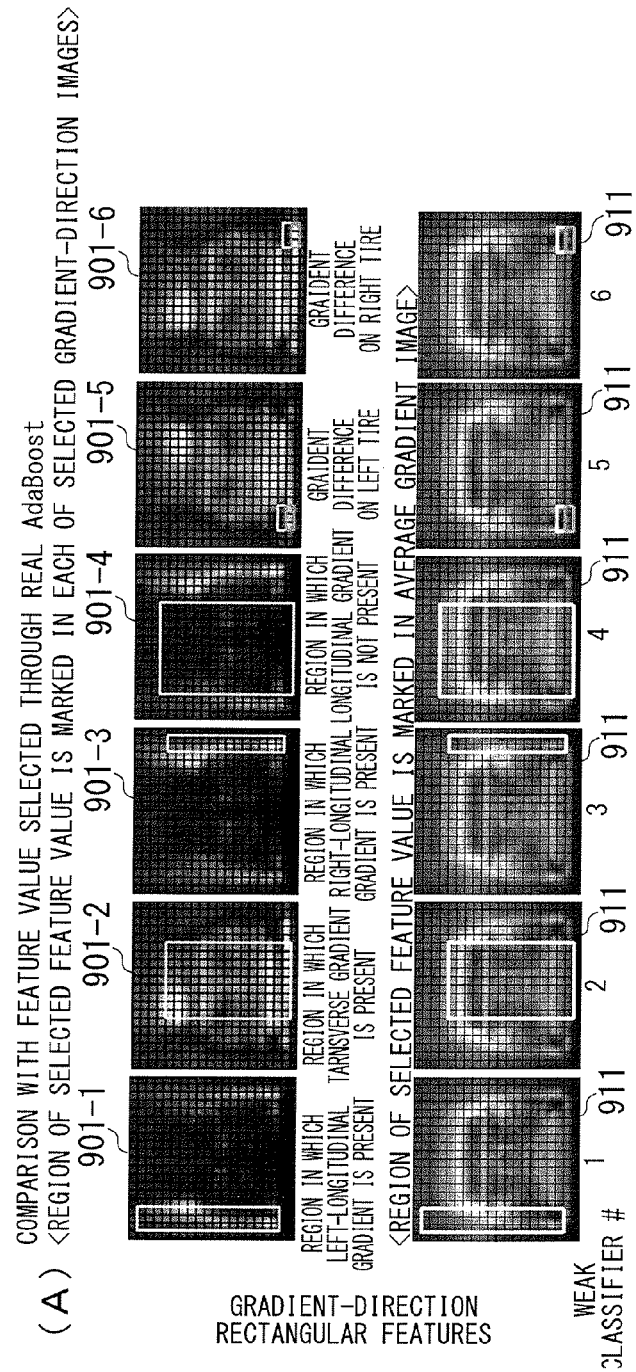
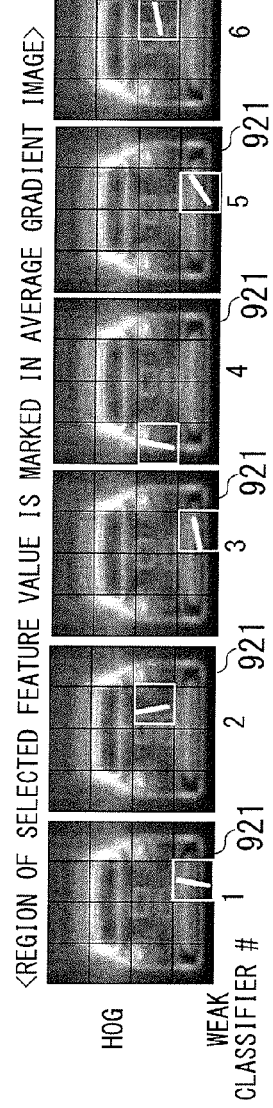

IMAGE RECOGNITION DEVICE, IMAGE RECOGNITION METHOD, AND IMAGE RECOGNITION PROGRAM

CROSS REFERENCE TO RELATED APPLICATIONS

Priority is claimed on Japanese Patent Application No. 2012-020323, filed on Feb. 1, 2012, the contents of which are entirely incorporated herein by reference.

BACKGROUND OF THE INVENTION

1. Field of the Invention

The present invention relates to an image recognition device, an image recognition method, and an image recognition program.

2. Background Art

Recently, an adaptive cruise control (ACC) system, a forward collision warning (FCW) system, a pedestrian collision warning system, and the like have been developed as a driving support system or a preventive safety system of a vehicle. It is expected to spread low-cost systems using an on-board camera.

Pattern recognition has been often used for recognition of an object using an on-board camera.

A pattern recognition technique is a technique of learning a feature value of an object to be recognized in advance, creating a dictionary reflecting the learning result, and recognizing whether an object (an image of an object) is present in a captured image by combination with details of the dictionary.

Regarding the pattern recognition, after a face recognition algorithm in which Haar-like feature values and AdaBoost identifiers are combined (for example, see "Rapid Object Detection using a Boosted Cascade of Simple Features", Paul Viola and Michael Jones, Accepted Conference On Computer Vision And Pattern Recognition 2001 (Non-patent Document 1)) has been disclosed, techniques (for example, see Japanese Unexamined Patent Application, First Publication No. 2007-310805 (Patent Document 1)) applied to object recognition for a vehicle have been recently disclosed.

In such an object recognition algorithm, the processing speed is made to increase by preparing an integral image at the time of creating Haar-like feature values.

HOG (Histograms of Oriented Gradients) feature values and the like are also often used.

In the above-mentioned pattern recognition, in order to extract a target object (an image of a target object) from a captured image, object recognition regions (windows) are set to various sizes and the object recognition algorithm is performed for each window.

A pattern recognition process which is performed by an object recognition unit (for example, a processing unit corresponding to an object recognition unit 13 shown in FIG. 1) according to the background art will be described with reference to FIG. 21.

FIG. 21 is a flowchart illustrating an example of a process flow which is performed by an object recognition unit according to the background art.

In this example, a recognition algorithm is constructed by Haar-like feature values and AdaBoost classifiers.

First, the object recognition unit performs a process of integrating an intensity image on an acquired intensity image and calculates an integral image as a result (step S1011).

Then, the object recognition unit extracts a region of the integral image with a predetermined coordinate region (window) by raster scanning (step S1012).

Subsequently, the object recognition unit calculates a Haar-like feature value (vector) of the extracted coordinate region (window) (step S1013).

Then, the object recognition unit performs classification with a real AdaBoost classifier by the use of the calculated Haar-like feature value (vector) and recognizes an object (an image of an object) which is previously set as a target (step S1014).

Here, the object recognition unit determines whether a series of raster scans has completed (step S1015).

Then, the object recognition unit ends the process flow when it is determined that a series of raster scans has completed.

On the other hand, when it is determined that a series of raster scans has not completed, the object recognition unit causes the window to shift (to slide) over the raster scan region and performs the process of step S1012.

In this manner, the object recognition unit causes the window to sequentially slide in the raster scan region and carries out repeated performance of the processes of step S1012 to step S1014, until a series of raster scans has completed.

In the series of raster scans, for example, after causing a window with a fixed scale (size) to sequentially slide over an image region and repeated performance of the above-mentioned processes has completed, changing the scale or the moving step (scanning step) of the window, causing the window to sequentially slide, and carrying out repeated performance of the above-mentioned processes a predetermined number of times.

SUMMARY OF THE INVENTION

However, in the object recognition algorithm using the Haar-like feature value and the AdaBoost classifier, since features that the contrast between adjacent regions based on intensity is at a low level (the information volume is small) are used, there is a problem in that the number of weak classifiers increases so as to analize features of a target object (an image of a target object).

Even when a gradient magnitude is calculated for each gradient direction and feature values having larger information volumes are used, like the HOG feature values, the feature values are generally calculated from divided regions (cells) with a fixed size and a set of cells (block), thus the operating process is complicated, and the processing time is long. Accordingly, there is the same problem in that the degree of freedom is low and the number of weak classifiers increases.

When the number of weak classifiers increases, the number of calculations and the number of accesses to a memory increase, and the operating process time for each window increases. As a result, it is difficult to mount the algorithm, for example, on an on-board recognition device.

The present invention is made in consideration of the above-mentioned circumstances and an object thereof is to provide an image recognition device, an image recognition method, and an image recognition program which can improve efficiency of image recognition.

(1) To achieve the above-mentioned object, an image recognition device according to an aspect of the present invention includes: an image acquiring unit configured to acquire an image; and an object recognition unit configured to calculate gradient directions and gradient values of intensity of the image acquired by the image acquiring unit, to scan the gradient values of each acquired gradient direction with a window, to calculate a rectangular feature value, and to recognize a target object using a classifier based on the rectangular feature value.

(2) Another aspect of the present invention provides the image recognition device according to (1), wherein the object recognition unit uses as the rectangular feature value one or more kinds of: single-rectangle feature values; Haar-like feature values; feature values based on a plurality of features (Haar-like application) with different rectangular areas adjacent to each other in the same gradient direction; feature values based on a plurality of features with equal or different rectangular areas separated in the same gradient direction; and feature values based on a plurality of features with equal or different rectangular areas separated in the different gradient directions.

(3) Another aspect of the present invention provides the image recognition device according to (1) or (2), wherein the object recognition unit applies any operation of four arithmetic operations to the rectangular feature values when relationships of a plurality of rectangles are used as feature values.

(4) Another aspect of the present invention provides the image recognition device according to any one of (1) to (3), wherein the object recognition unit performs normalization based on an illumination difference using as the rectangular feature value any one of: an average value of a window unit; a standard deviation value of the window unit; an average value of a raster scan region; and a standard deviation value of the raster scan region.

(5) Another aspect of the present invention provides the image recognition device according to any one of (1) to (4), wherein the object recognition unit selects a weak classifier obtained through learning of rectangular features as a classifier and uses the selected weak classifier for recognition.

(6) Another aspect of the present invention provides the image recognition device according to any one of (1) to (5), wherein the object recognition unit creates the classifier through boosting or other ensemble learning.

(7) Another aspect of the present invention provides the image recognition device according to any one of (1) to (6), wherein the object recognition unit uses an AdaBoost classifier or a real AdaBoost classifier as the classifier.

(8) Another aspect of the present invention provides the image recognition device according to any one of (1) to (7), wherein the object recognition unit uses coefficients for normalizing a range of the rectangular feature values to select the classifier.

(9) Another aspect of the present invention provides the image recognition device according to (8), wherein the coefficients for normalizing the range of rectangular feature values are values simultaneously learned when creating the classifier through learning.

(10) To achieve the above-mentioned object, an image recognition method according to another aspect of the present invention includes: causing an image acquiring unit to acquire an image; and causing an object recognition unit to calculate gradient directions and gradient values of intensity of the image acquired by the image acquiring unit, to scan the gradient values of each acquired gradient direction with a window, to calculate a rectangular feature value, and to recognize a target object using a classifier based on the rectangular feature value.

(11) To achieve the above-mentioned object, an image recognition program according to another aspect of the present invention causes a computer to perform: a sequence of causing an image acquiring unit to acquire an image; and a sequence of causing an object recognition unit to calculate gradient directions and gradient values of intensity of the image acquired by the image acquiring unit, to scan the gradient values of each acquired gradient direction with a window, to calculate a rectangular feature value, and to recognize a target object using a classifier based on the rectangular feature value.

As described above, according to the aspects of the present invention, it is possible to provide an image recognition device, an image recognition method, and an image recognition program which can improve efficiency of image recognition.

Figure 3:
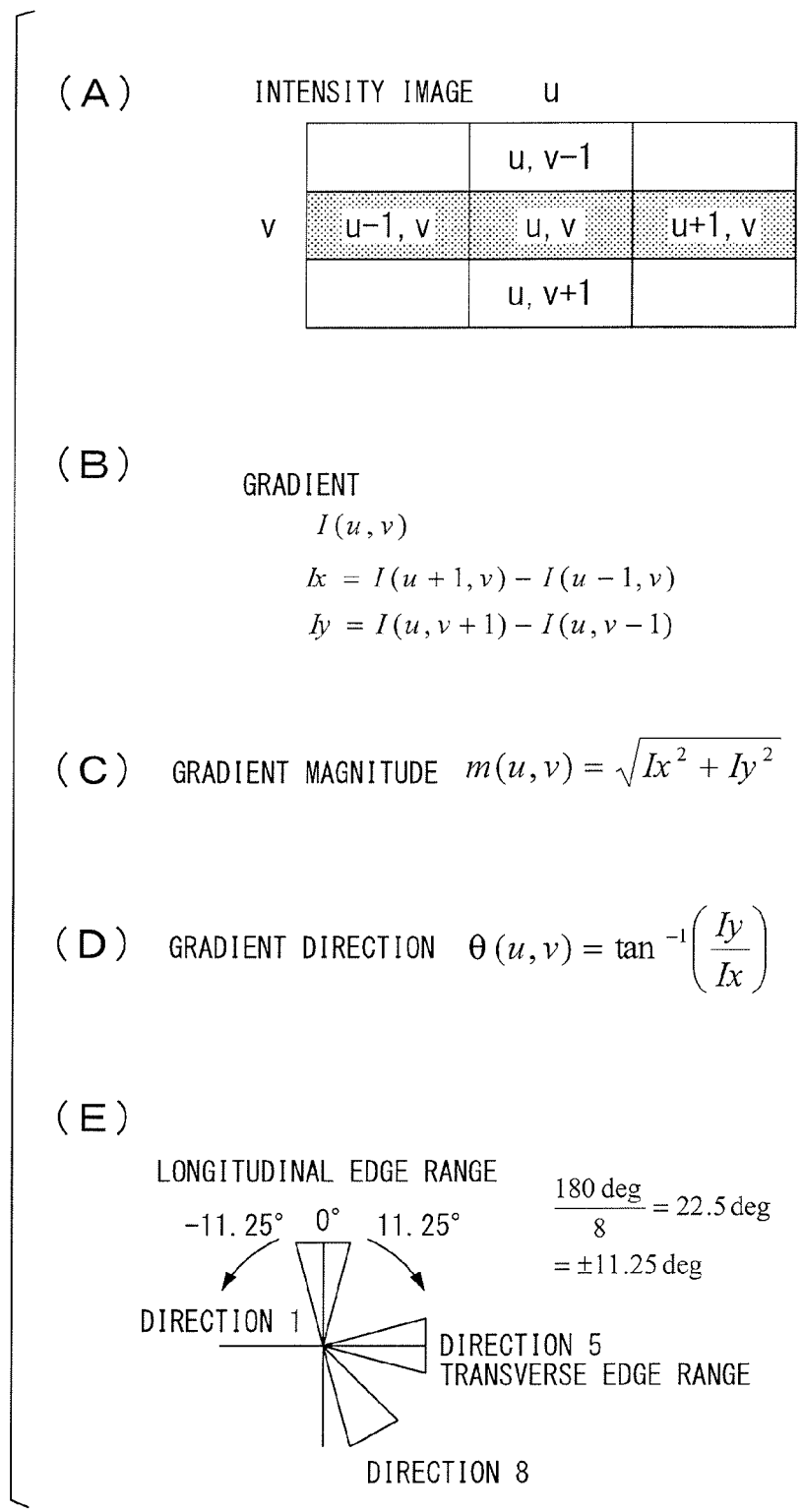

Part (A) of FIG. 3 is an expression illustrating an example of an intensity image, Part (B) thereof is an expression illustrating an example of a gradient, Part (C) thereof is an expression illustrating an example of a gradient magnitude, Part (D) thereof is an expression illustrating an example of a gradient direction, and Part (E) thereof is a diagram illustrating an example of each gradient direction range.

Figure 4:
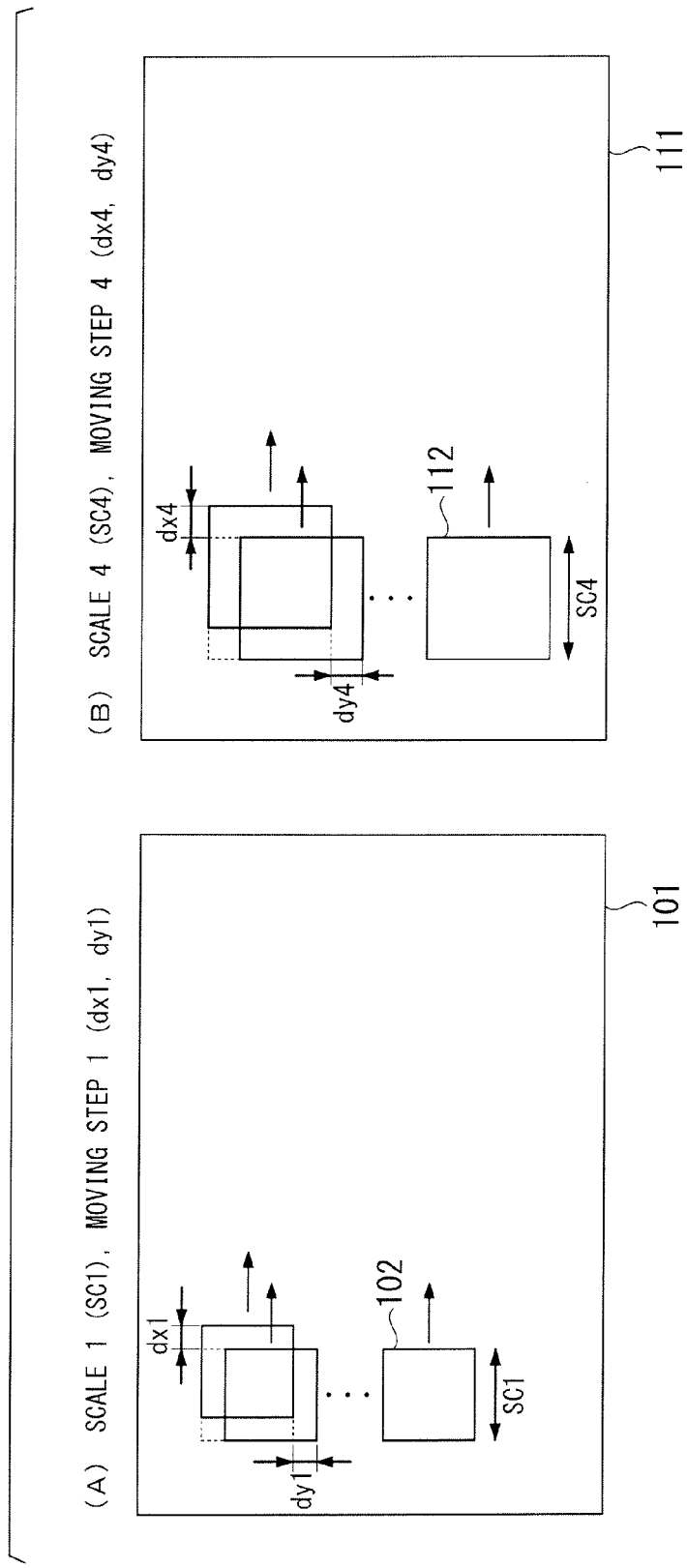

Part (A) and Part (B) of FIG. 4 are diagrams illustrating examples of the scale and the movement step of a raster scan.

Figure 5:
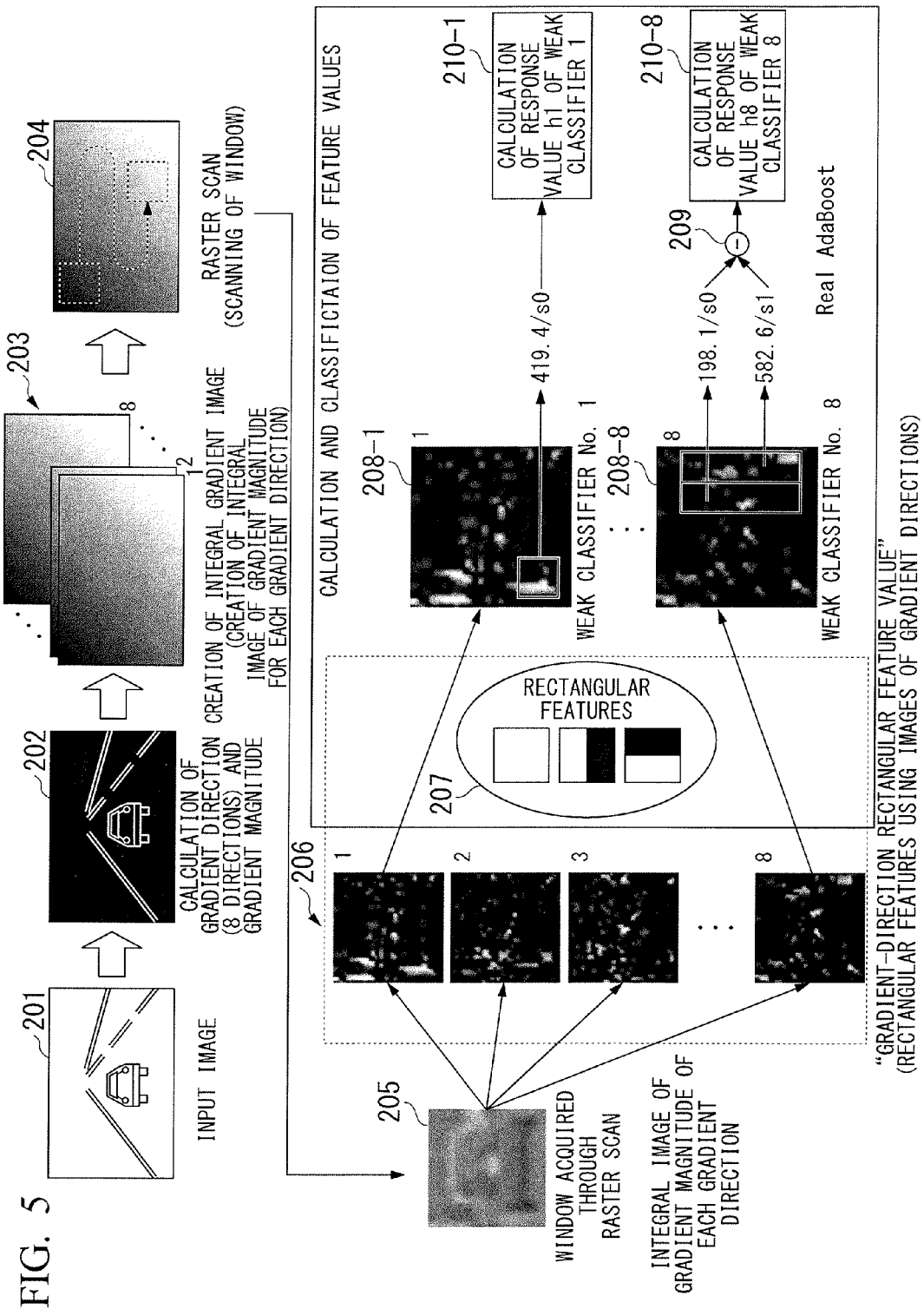

FIG. 5 is a diagram illustrating a schematic example of processes from image acquisition to object recognition in an image recognition system according to an embodiment of the present invention.

FIG. 6 is a diagram illustrating gradient-direction rectangular feature value A according to a first example.

Part (A), Part (B), and Part (C) of FIG. 7 are diagrams illustrating gradient-direction rectangular feature value B according to a second example.

FIG. 8 is a diagram illustrating gradient-direction rectangular feature value C according to a third example.

Figure 9:
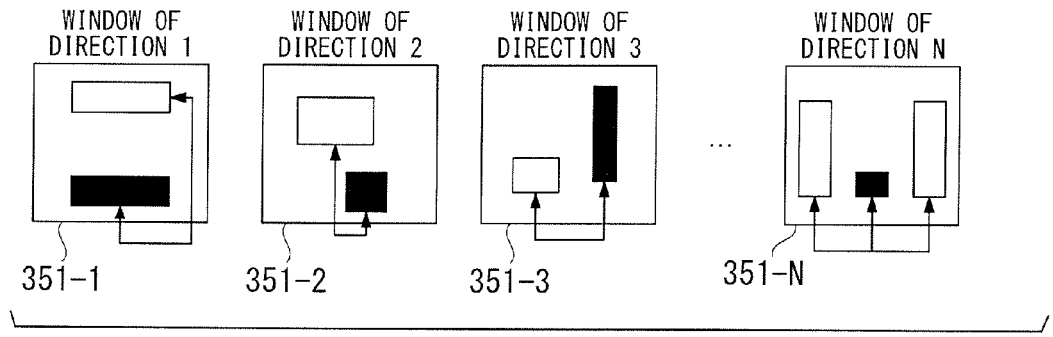

FIG. 9 is a diagram illustrating gradient-direction rectangular feature value D according to a fourth example.

Figure 10:
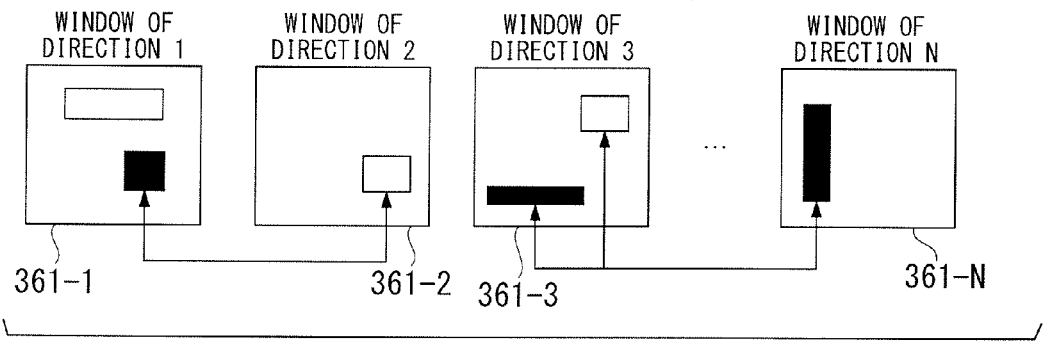

FIG. 10 is a diagram illustrating gradient-direction rectangular feature value E according to a fifth example.

Figure 11:
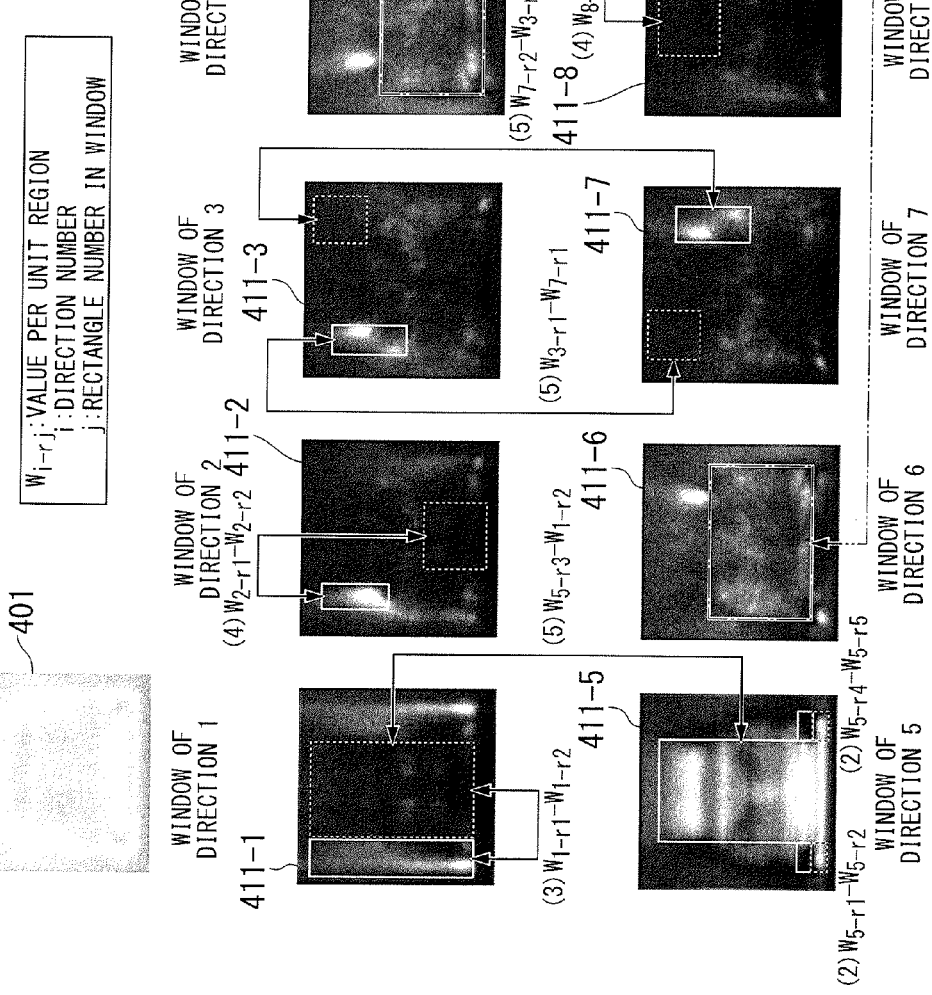

FIG. 11 is a diagram illustrating a specific example of a gradient-direction rectangular feature value.

Figure 12:
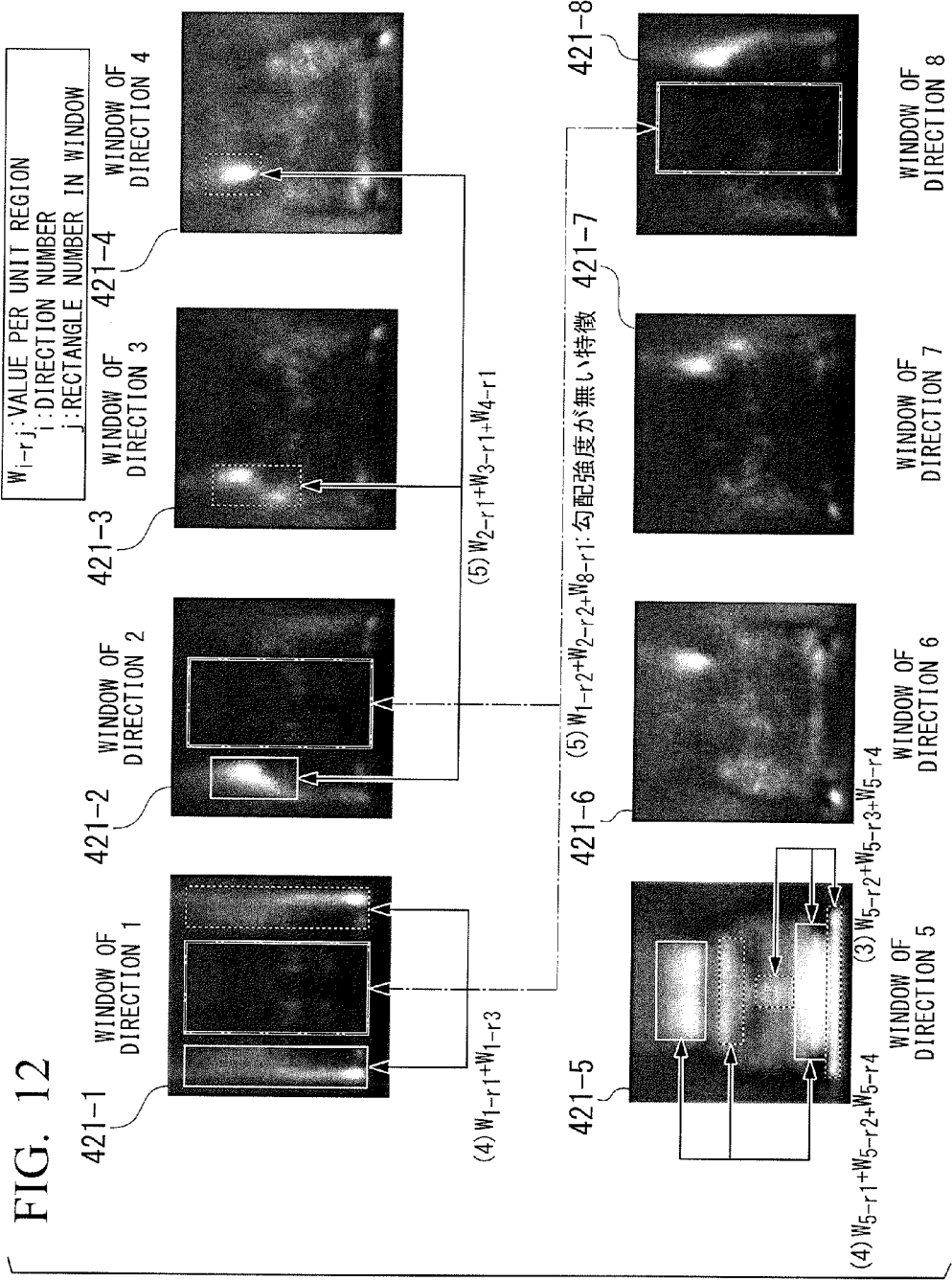

FIG. 12 is a diagram illustrating a specific example of a gradient-direction rectangular feature value.

Figure 13:
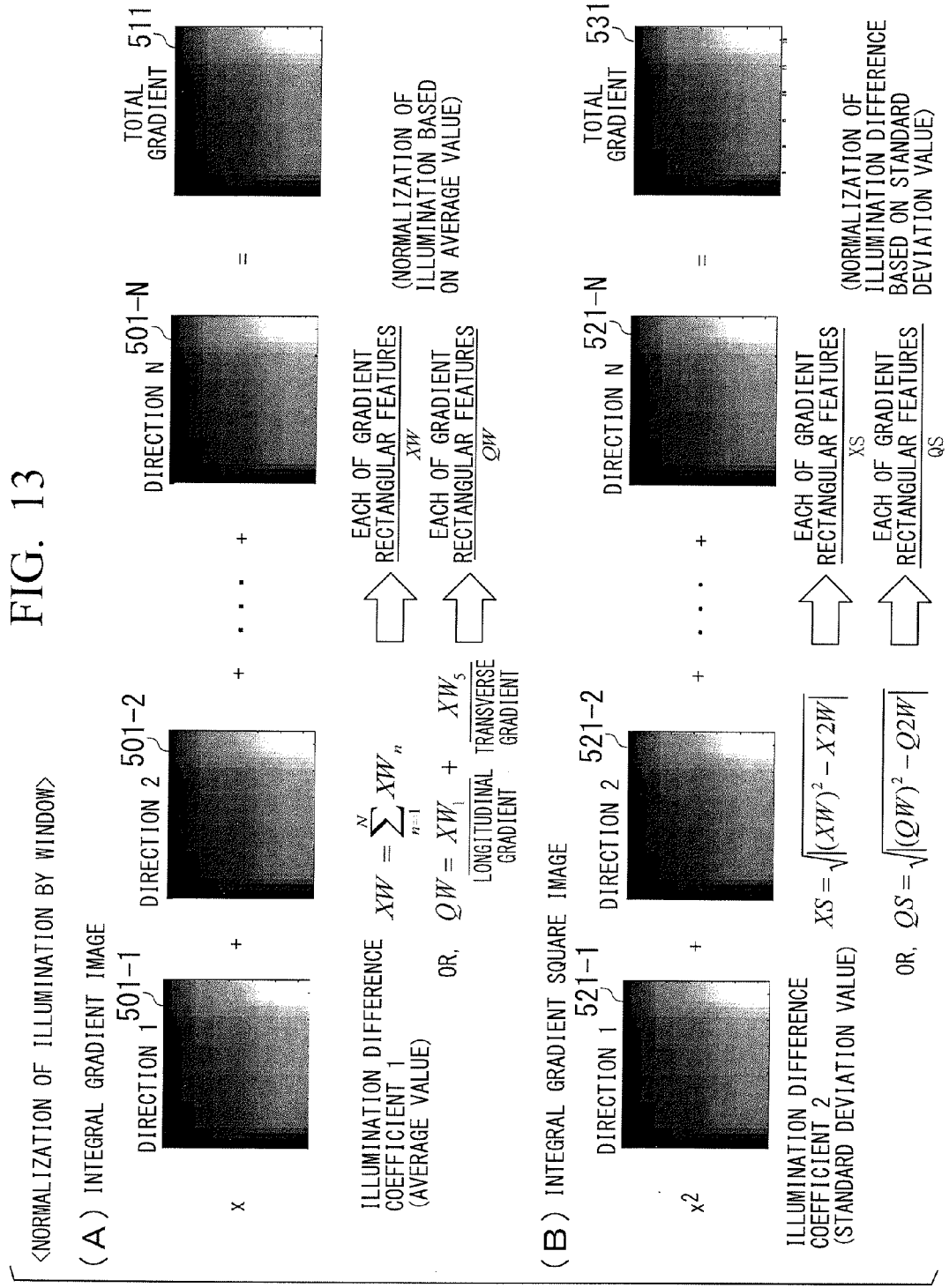

Part (A) of FIG. 13 is a diagram illustrating an example of a normalization coefficient of an illumination difference of gradient-direction rectangular feature values and Part (B) thereof is a diagram illustrating another example of the normalization coefficient of an illumination difference of gradient-direction rectangular feature values.

Figure 14:
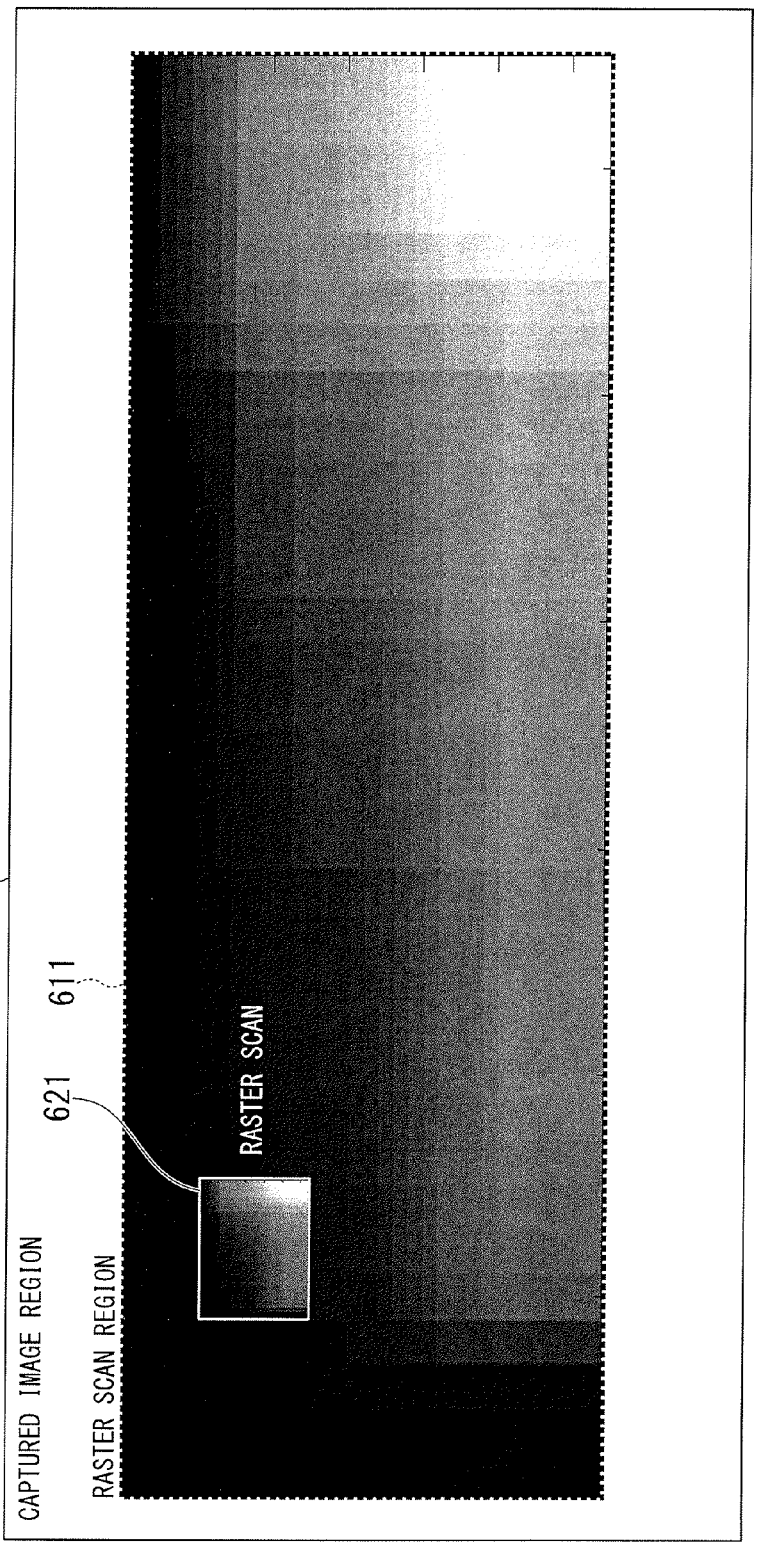

FIG. 14 is a diagram illustrating another example of a normalization coefficient of an illumination difference of gradient-direction rectangular feature values.

Figure 15:
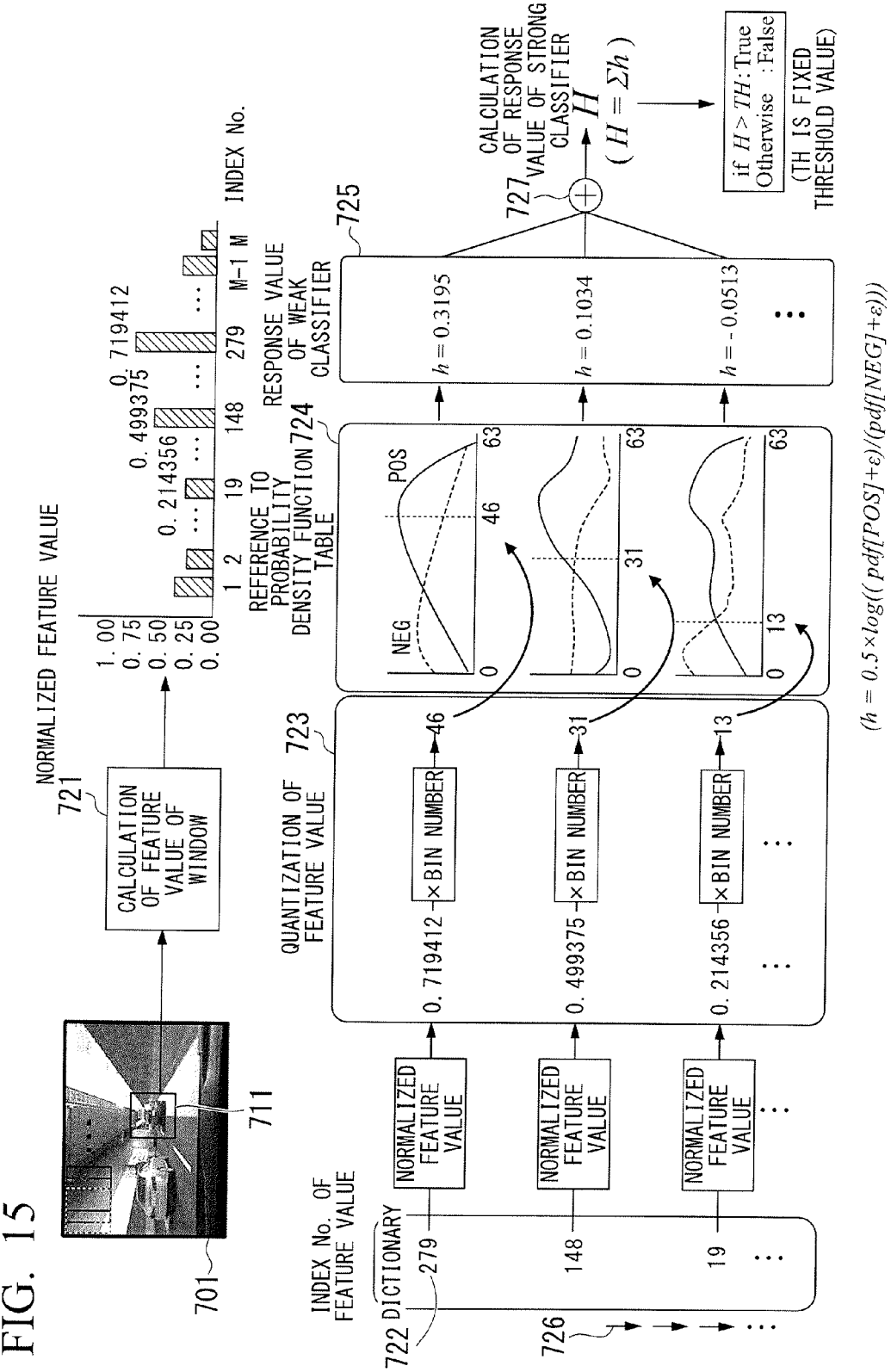

FIG. 15 is a diagram illustrating an example of real AdaBoost.

Figure 16:
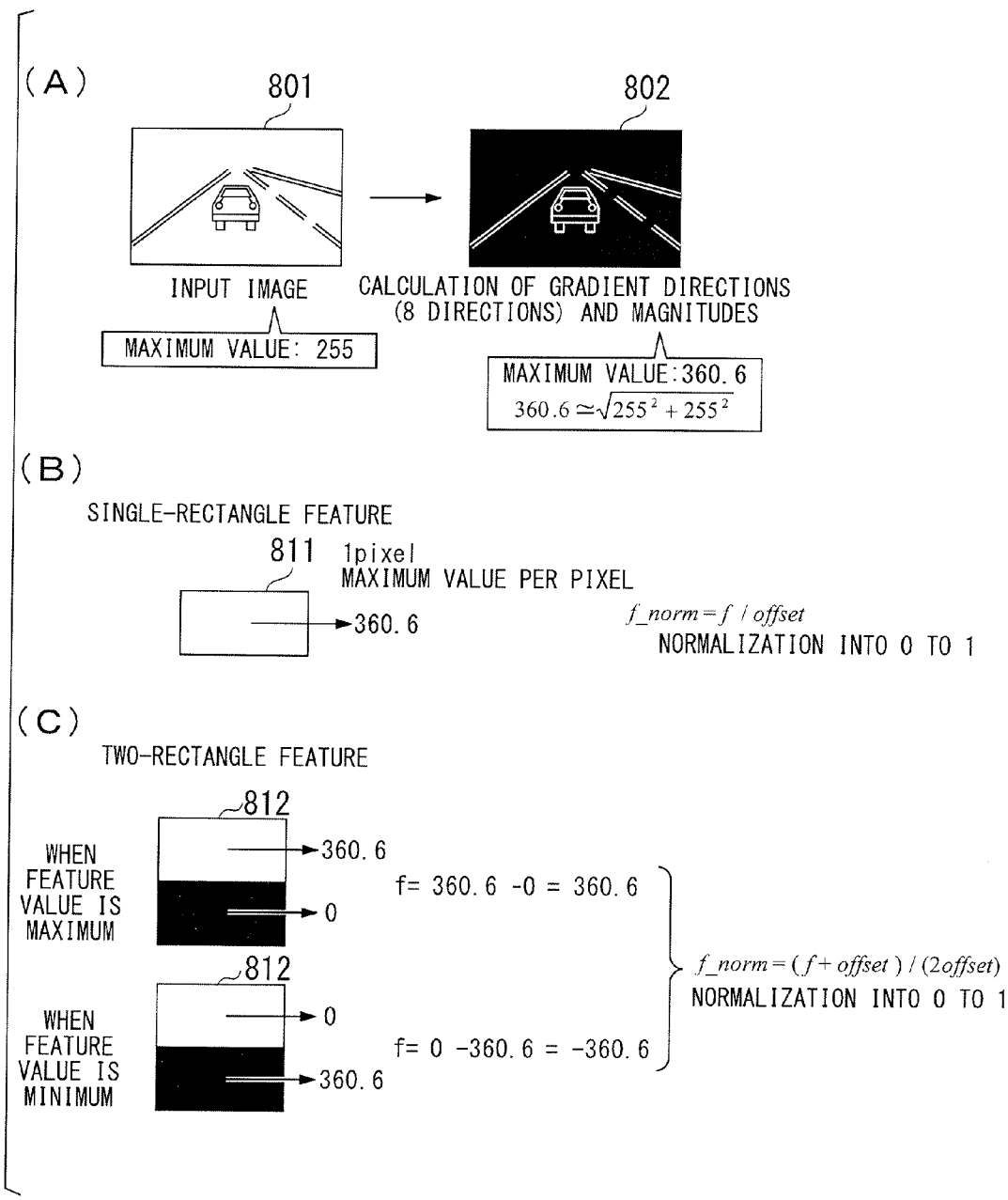

FIG. 16 is a diagram illustrating normalization of a range of gradient-direction rectangular feature values.

FIG. 17 is a diagram illustrating comparison of gradient-direction rectangular feature values and HOG feature values.

Figure 18:
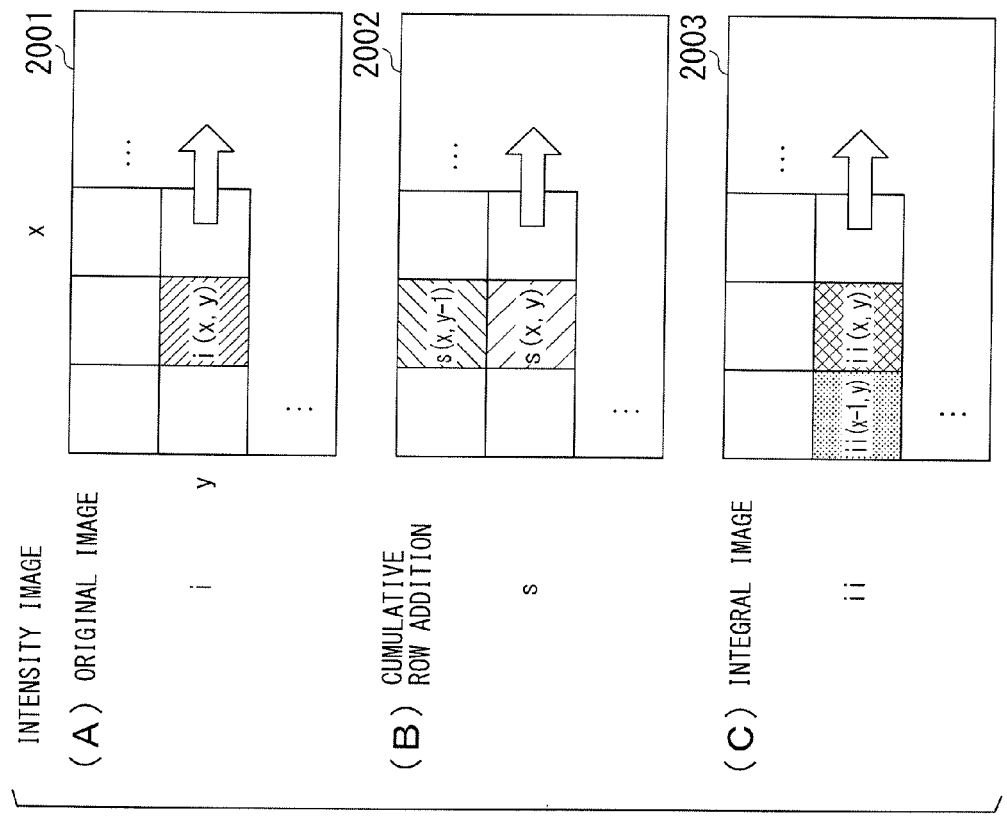

Part (A) of FIG. 18 is a diagram illustrating an example of an original image, Part (B) thereof is a diagram illustrating an example of a result of cumulative row addition, and Part (C) thereof is a diagram illustrating an example of an integral image.

Figure 19:
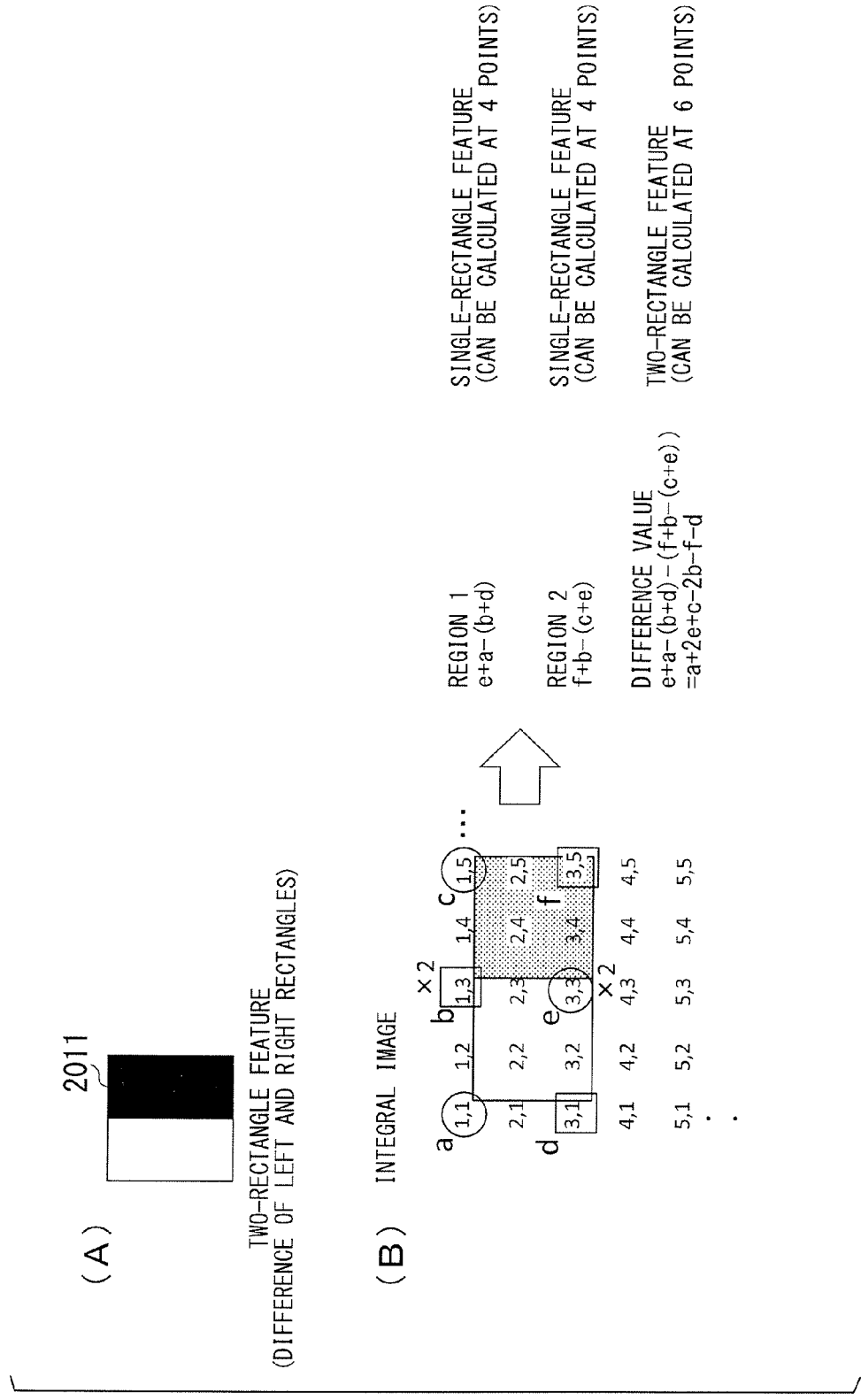

Part (A) and Part (B) of FIG. 19 are diagrams illustrating Haar-like feature values.

Figure 20:
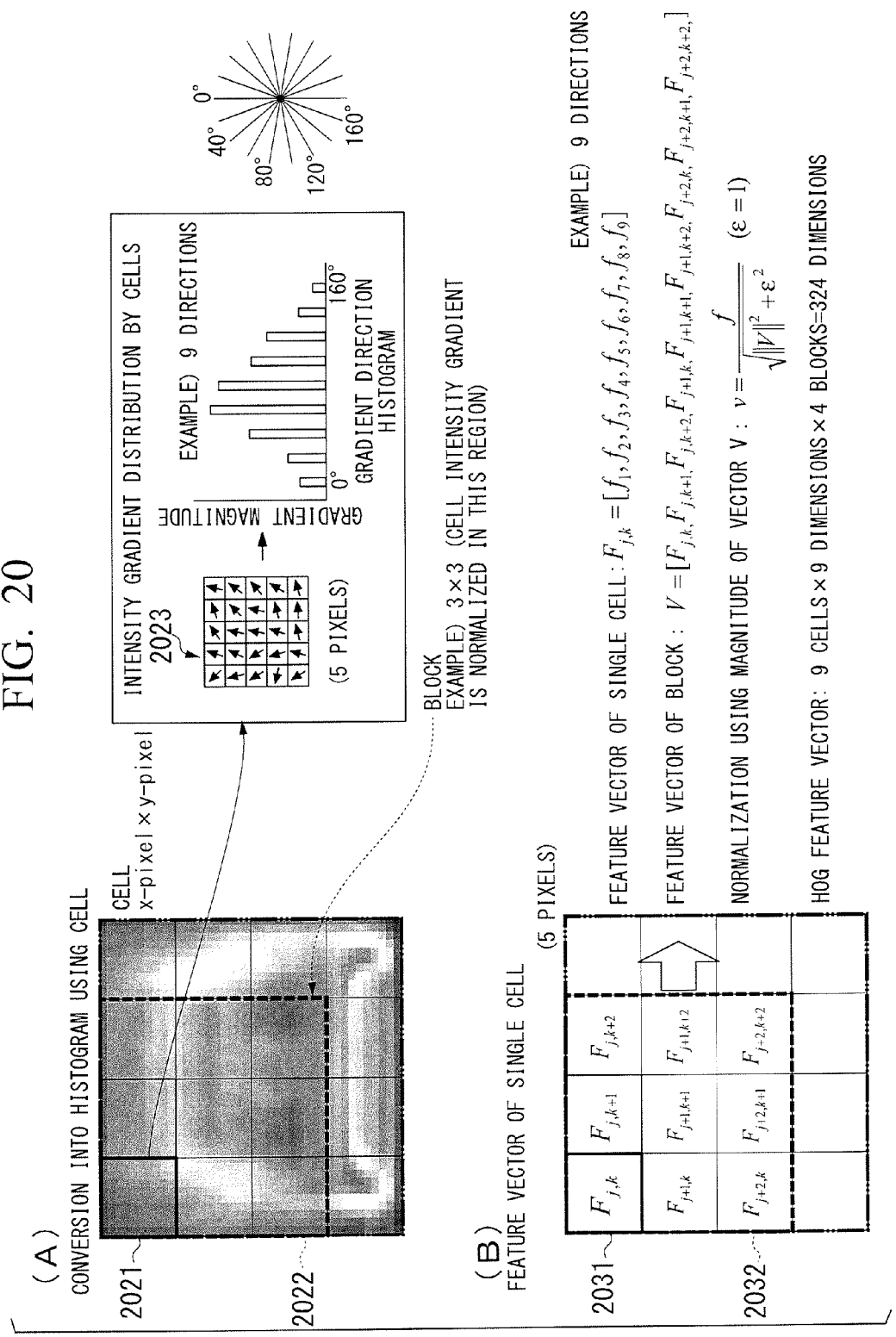

Part (A) and Part (B) of FIG. 20 are diagrams illustrating HOG feature values.

Figure 21:
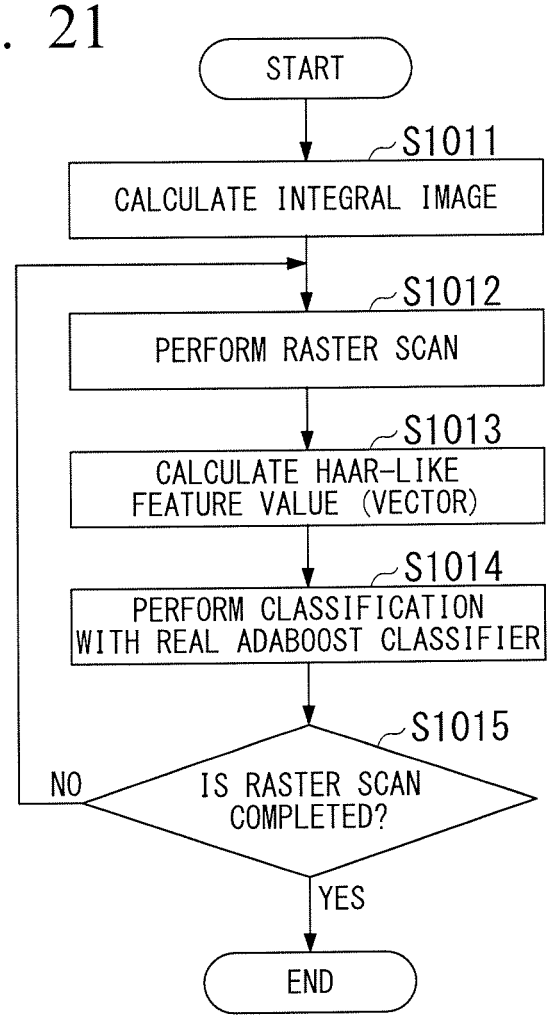

FIG. 21 is a flowchart illustrating an example of a process flow which is performed by an object recognition unit according to the background art.

DETAILED DESCRIPTION OF THE INVENTION

Definition of Terms

In this specification, a rectangle includes a square as well as a rectangle.

In this specification, a gradient-direction rectangular feature is a rectangular feature associated with a gradient direction and a gradient magnitude of intensity of an image. In this specification, a gradient-direction rectangular feature value (or ROG (Rectangle of Oriented Gradients) feature value) is a feature value of a gradient-direction rectangular feature and is a gradient-direction feature value in a rectangular region. Here, the gradient-direction feature value is a feature value related to a gradient direction and a gradient magnitude of intensity of an image. For example, known features can be used as a rectangular feature, and known gradient frequencies with a reduced information volume can be used as the gradient magnitude. In this specification, an extensive gradient value including the gradient magnitude and the gradient frequency is defined as a gradient value.

In this specification, an integral gradient image (integral histogram) is a result (integral gradient value) of calculation of the gradient direction and the gradient magnitude (or frequency) of intensity of an image and integration the gradient magnitude (or frequency) of each gradient direction. Here, the integration is performed on all pixels included in a region from which an integral gradient image should be calculated.

Examples of a classifier include various classifiers such as a real AdaBoost classifier, an AdaBoost classifier, and an SVM classifier.

A subordinate concept of the classifier includes a classifier performing ensemble learning, a subordinate concept thereof includes a boosting classifier, and a subordinate concept thereof includes a real AdaBoost classifier.

Here, boosting includes performing ensemble learning using multiple weak classifiers.

Embodiments

In this embodiment, an on-board image recognition system which is mounted on a vehicle will be described as an example.

Figure 1:
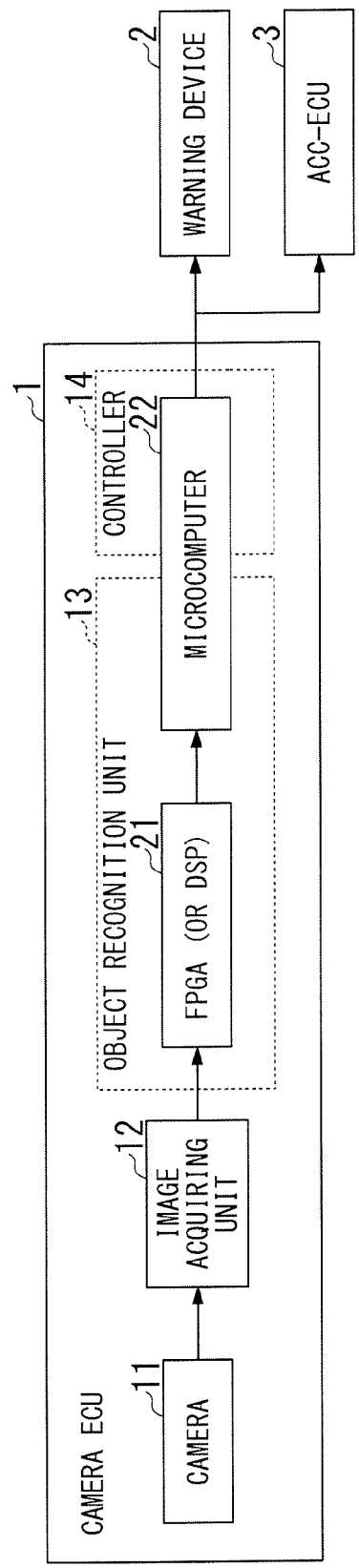
FIG. 1 is a block diagram schematically illustrating a configuration (hardware configuration) of an image recognition system according to an embodiment of the present invention.

FIG. 1 is a block diagram schematically illustrating a configuration (hardware configuration) of an image recognition system according to an embodiment of the present invention.

The image recognition system according to this embodiment includes a camera ECU (Electronic Control Unit) 1, a warning device 2, and an ACC-ECU 3.

The camera ECT 1 is an example of an image recognition device.

The camera ECU 1 includes a camera 11, an image acquiring unit 12, an object recognition unit 13, and a controller 14.

In this embodiment, the object recognition unit 13 is constructed using the function of an FPGA (Field Programmable Gate Array) 21 and the function of a microcomputer 22.

The function of DSP (Digital Signal Processor) may be used instead of the function of the FPGA 21 or in addition to the function of the FPGA 21.

In this embodiment, the controller 14 is constructed using the function of the microcomputer 22.

The memory and the peripheral circuits of the object recognition unit 13 and the controller 14 may employ memories and peripheral circuits stored in integrated circuits of the FPGA, the DSP, or the microcomputer or may be disposed outside them.

In the object recognition unit 13 and the controller 14, the number of devices such as the FPGA, the DSP, and the microcomputer may be set to any number and, for example, all devices may be used or all processing functions may be mounted on a single device or on two devices without using all devices.

Processing units of the image recognition system according to this embodiment will be described briefly below.

In this embodiment, the camera 11 is disposed at vehicle positions for capturing an image of a predetermined direction, such as a front side, a lateral side, or a rear side of a vehicle.

The camera 11 captures an image and outputs signals of the captured image to the image acquiring unit 12.

The image acquiring unit 12 receives the image from the camera 11 as image data and outputs the received image data to the object recognition unit 13.

The object recognition unit 13 performs an image processing operation and a pattern recognition operation on the image data input from the image acquiring unit 12 by the use of the FPGA 21 or the microcomputer 22 for the purpose of recognizing an object and outputs result information of the object recognition process to the controller 14. For example, a filtering process as a preprocess is performed as the image process.

For example, information of a target object in the image of the image data is used as the result information of the pattern recognition.

The controller 14 performs a predetermined process based on the result information of the object recognition process input from the object recognition unit 13, and outputs the result information to the warning device 2 or the ACC-ECU 3.

In a specific example, the controller 14 performs a process of calculating a TTC (Time-to-Collision) or a distance to a target object, a process of tracking a target object, a process of communicating with an application function of another device or ECU (the warning device 2 or the ACC-ECU 3 in this embodiment), and the like as a predetermined process based on information of a target object which is the result information of an object recognition process input from the object recognition unit 13.

The warning device 2 or the ACC-ECU 3 are disposed to execute the application functions through the use of the controller 14 of the camera ECU 1.

The warning device 2 warns a driver, for example, about forward vehicle collision when a target object is a forward vehicle or pedestrian collision when a target object is a pedestrian.

The ACC-EUC 3 performs adaptive cruise control and the like, for example, when a target object is a forward vehicle based on information input from the control unit 14.

Processes which are performed by the object recognition unit 13 according to this embodiment will be described below with reference to FIG. 2.

Figure 2:
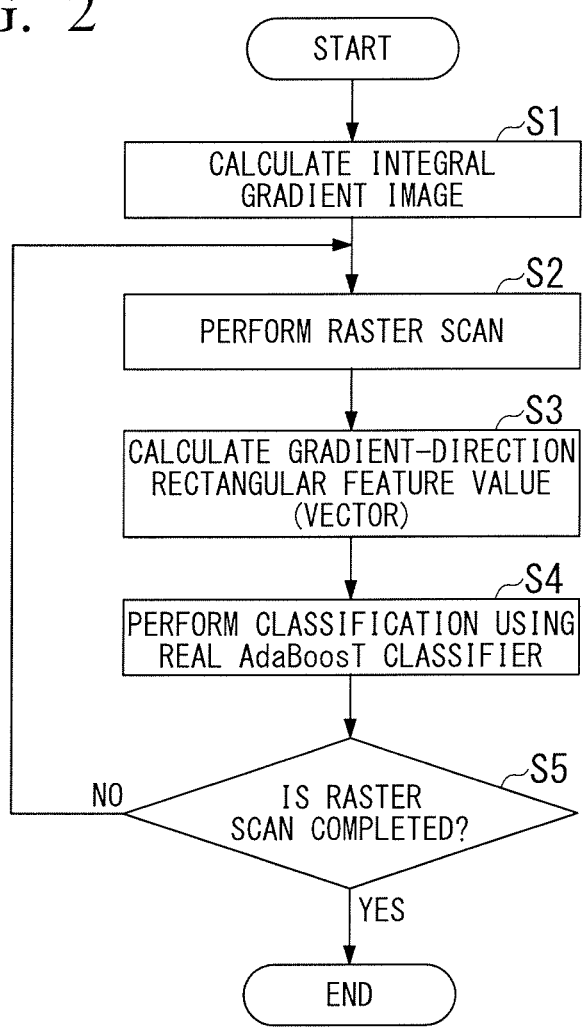
FIG. 2 is a flowchart illustrating an example of a process flow which is performed by an object recognition unit according to an embodiment of the present invention.

FIG. 2 is a flowchart illustrating an example of a process flow which is performed by the object recognition unit 13 according to this embodiment.

In this example, a recognition algorithm is constructed by Haar-like feature values and AdaBoost classifiers.

First, the object recognition unit 13 performs a process of calculating a gradient direction and a gradient magnitude from an intensity image and integrating the gradient magnitude of each gradient direction is performed on the acquired intensity image, and calculates an integral gradient image (integral histogram) as a result (step S1).

The process of calculating the integral gradient image (integral histogram) is performed to shorten a subsequent operation processing time using the integral gradient image, and thus may not be performed. That is, in the subsequent processes, an operation capable of providing the same result without using the integral gradient image may be used.

Then, the object recognition unit 13 extracts a region of the integral gradient image with a predetermined coordinate region (window) through the use of raster scans (step S2).

Subsequently, the object recognition unit 13 calculates a predetermined gradient-direction rectangular feature value (vector) for the extracted coordinate region (window) (step S3).

Then, the object recognition unit 13 performs classification using the real AdaBoost classifier which is an example of boosting based on the calculated gradient-direction rectangular feature value (vector), and recognizes an object (image of an object) to be set as a target in advance (step S4).

Here, the object recognition unit 13 determines whether a series of raster scans has completed (step S5).

Then, the object recognition unit 13 ends the process flow when it is determined that a series of raster scans has completed.

On the other hand, when it is determined that a series of raster scans are not completed, the object recognition unit 13 causes the window to shift (slide) over the raster scan region and performs the process of step S2.

Accordingly, the object recognition unit 13 causes the window to sequentially slide over the raster scan region and carries out repeated performance of the processes of steps S2 to S4 until a series of raster scans has completed.

In the series of raster scans, for example, after causing a window with a fixed scale (size) to sequentially slide and repeated performance of the above-mentioned processes has completed, changing the scale or the scanning step of the window, causing the window to sequentially slide, and carrying out repeated performance of the above-mentioned processes a predetermined number of times.

Here, the function of a classifier is performed by the object recognition unit 13 in this embodiment. That is, it can be understood that the object recognition unit 13 includes a classifier.

In the object recognition unit 13 according to this embodiment, the function of calculating an integral gradient image is embodied by the FPGA 21 and the other functions performed by the object recognition unit 13 is embodied by the microcomputer 22.

The processes shown in FIG. 2 will be specifically described below.

An example where a gradient direction and a gradient magnitude are calculated will be described with reference to Part (A) of FIG. 3 to Part (E) of FIG. 3.

Part (A) of FIG. 3 is a diagram illustrating an example of an intensity image.

In this example, the pixel position in the x axis in the transverse (horizontal) direction is defined as u, and the coordinate value increases toward the right side. The pixel position in the y axis in the longitudinal (vertical) direction is defined as v, and the coordinate value increases toward the bottom.

The pixel position in the plane of x-y orthogonal coordinates is defined as a coordinate (u, v).

Part (B) of FIG. 3 shows an expression illustrating an example of a gradient.

In this example, the intensity at the pixel position of a coordinate (u, v) is defined as I(u, v).

The gradient of intensity in the transverse (horizontal) direction at the pixel position of a coordinate (u, v) is defined as Ix, and Ix is expressed by Equation (1). The gradient of intensity in the longitudinal (vertical) direction at the pixel position of a coordinate (u, v) is defined as Iy, and Iy is expressed by Equation (2).

$$I_x = I(u+1, v) - I(u-1, v) \quad (1)$$

$$I_y = I(u, v+1) - I(u, v-1) \quad (2)$$

Part (C) of FIG. 3 shows an expression illustrating an example of a gradient magnitude.

In this example, the gradient magnitude at the pixel position of a coordinate (u, v) is defined as m(u, v), and m(u, v) is expressed by Equation (3).

Part (D) of FIG. 3 shows an expression illustrating an example of a gradient direction.

In this example, the gradient direction at the pixel position of a coordinate (u, v) is defined as θ(u, v), and θ(u, v) is expressed by Equation (4).

$$m(u, v) = \sqrt{Ix^2 + Iy^2} \quad (3)$$

$$\theta(u, v) = \tan^{-1}\left(\frac{Iy}{Ix}\right) \quad (4)$$

Part (E) of FIG. 3 is a diagram illustrating an example of gradient direction ranges.

In this example, 180 degrees are divided into eight direction ranges (direction 1 to direction 8). In this case, one direction range has 22.5 degrees, and is a range of ±11.25 degrees about the central angle of the corresponding range.

In this example, when direction 1 is set as a longitudinal gradient range, direction 5 is the transverse gradient range. Here, the gradient of intensity in an image corresponds to a differential image. For example, linkage of pixel positions at which the gradient of intensity is larger than a predetermined threshold value can be detected as a gradient.

Other techniques such as a technique using a Sobel filter may be used as the technique of calculating a gradient.

The integral gradient image is often used, for example, to calculate HOG feature values, but is used to calculate rectangular feature values in this embodiment.

The raster scan in the process of step S2 shown in FIG. 2 is, for example, the same as the raster scan in the process of step S1012 shown in FIG. 21.

In the raster scan, the scanning is performed, for example, by changing the scale SC and the moving step dx and dy.

Part (A) and Part (B) of FIG. 4 are diagrams illustrating an example of the scale and the moving step of the raster scan.

In this example, it is assumed that there are four or more patterns of combinations of the scale and the moving step of the raster scan.

Part (A) of FIG. 4 is a diagram illustrating an example of scale SC1 and moving step dx1 and dy1 of the raster scan in the first pattern.

In this example, in a raster scan region 101, a square window 102 having the length of scale SC1 in the x axis direction as the transverse (horizontal) direction and the y axis direction as the longitudinal (vertical) direction is set to a predetermined initial position. This window 102 is made to slide in the x axis direction by moving step dx1 and to slide in the y axis direction by moving step dy1.

Part (B) of FIG. 4 is a diagram illustrating an example of scale SC4 and moving steps dx4 and dy4 of the raster scan in the fourth pattern.

In this example, in a raster scan region 111, a square window 112 having the length of scale SC4 in the x axis direction as the transverse (horizontal) direction and the y axis direction as the longitudinal (vertical) direction is set to a predetermined initial position. This window 112 is made to slide in the x axis direction by moving step dx4 and to slide in the y axis direction by moving step dy4.

In this embodiment, the values of scale SC1 and moving steps dx1 and dy1 of the raster scan in the first pattern are different from the values of scale SC4 and moving steps dx4 and dy4 of the raster scan in the fourth pattern.

In this embodiment, for example, scales SC of the raster scans in the patterns are different and moving steps dx and dy having a magnitude proportional to the scale SC are used. In this embodiment, for example, the moving step dx in the x axis direction and the moving step dy in the y axis direction in each pattern are set to the same value.

In another configuration example, a window having a shape (for example, a rectangular other than a square) other than the square may be used.

In another configuration example, the moving step dx in the x axis direction and the moving step dy in the y axis direction in a certain pattern may be set to different values.

FIG. 5 is a diagram illustrating a schematic example of processes from image acquisition to object recognition in an image recognition system according to an embodiment of the present invention.

Data of the image captured by the camera 11 is acquired as data of an input image 201 by the image acquiring unit 12.

For example, a road and a preceding vehicle appear in the image.

As shown in a gradient magnitude image 202, the object recognition unit 13 calculates a gradient magnitude for each of multiple gradient directions (eight directions of direction 1 to direction 8 in this embodiment).

The object recognition unit 13 creates an integral image of the gradient magnitude of each gradient direction as an integral gradient image 203 (the process of step S1 shown in FIG. 2).

Then, the object recognition unit 13 scans a raster scan region 204 with a window (the process of step S2 shown in FIG. 2).

The object recognition unit 13 acquires an integral gradient image 206 of each gradient direction from the image 205 of the window acquired through the raster scan.

For example, the image 205 of the window is an image of a part in which a preceding vehicle appears.

The object recognition unit 13 calculates and acquires a predetermined rectangular feature value (gradient-direction rectangular feature value) 207 for the integral gradient image 206 of each gradient direction in the same window (the process of step S3 shown in FIG. 2).

Then, the object recognition unit 13 performs classification using a real AdaBoost classifier (the process of step S4 shown in FIG. 2).

In this embodiment, weak classifier can be set as the classifier for each gradient direction.

Specifically, the object recognition unit 13 classifies the integral gradient image 206 (integral gradient image 208-1 to integral gradient image 208-8 for each gradient direction of eight directions in this embodiment) of each gradient direction using a previously-learned weak classifier.

In the example shown in FIG. 5, a value of $W_{i-r1}=419.4/s0$ is acquired as the classification result of the integral gradient image 208-1 of direction 1 using the weak classifier. Here, s0 represents the area of a rectangular region from which the value is acquired. The object recognition unit 13 performs a process 210-1 of calculating a response value h1 of the weak classifier based on the value.

In the example shown in FIG. 5, a value of $W_{8-r1}=198.1/s0$ is acquired as the classification result of the integral gradient image 208-8 of direction 8 using the weak classifier. Here, s0 represents the area of a rectangular region from which the value is acquired. In the example shown in FIG. 5, a value of $W_{8-r2}=582.6/s1$ is acquired as the classification result of the integral gradient image 208-8 of direction 8 using the weak classifier. Here, s1 represents the area of a rectangular region from which the value is acquired. Subsequently, in this example, a subtraction result (difference) of two values is calculated by a subtractor 209. The object recognition unit 13 performs a process 210-8 of calculating a response value h8 of the weak classifier based on the value of the subtraction result.

An example of a gradient-direction rectangular feature value will be described below with reference to FIGS. 6 to 10.

In this embodiment, since rectangular features are extracted from the gradient magnitude images divided into the gradient directions, the rectangular feature values are defined as gradient-direction rectangular feature values.

FIG. 6 is a diagram illustrating gradient-direction rectangular feature value A according to a first example.

Gradient-direction rectangular feature value A shows the feature value (single-rectangle feature value) of a single-rectangle (single rectangle) feature 301.

Gradient-direction rectangular feature value A is intended to extract the single-rectangle feature from the gradient magnitude image of each gradient direction and to analyze the gradient of a single region.

For example, when a part in which a target object is present is concentrated on the same gradient direction, it can be considered as a single-rectangle feature.

Part (A) of FIG. 7, Part (B) of FIG. 7, and Part (C) of FIG. 7 are diagrams illustrating gradient-direction rectangular feature value B according to a second example.

Gradient-direction rectangular feature value B uses a difference among rectangular features for the gradient magnitude image of each gradient direction, similarly to the Haar-like feature value. Gradient-direction rectangular feature value B is used to calculate a difference among the features in the same direction using rectangles having the same area as adjacent rectangles.

Part (A) of FIG. 7 shows gradient magnitude images 311 and 312 when a window is divided into two rectangles to calculate gradient-direction rectangular feature value B. In this example, a difference among the features of a white region and a black region adjacent to each other is calculated.

Part (B) of FIG. 7 shows gradient magnitude images 321 and 322 when a window is divided into three rectangles to calculate gradient-direction rectangular feature value B. In this example, a difference among the features of a white region and a black region adjacent to each other is calculated.

Part (C) of FIG. 7 shows a gradient magnitude image 331 when a window is divided into four rectangles to calculate gradient-direction rectangular feature value B. In this example, a difference among the features of a white region and a black region adjacent to each other is calculated.

Gradient-direction rectangular feature value B is a technique for understanding the gradient relationship between the adjacent regions. In this embodiment, since the gradient-direction rectangular feature value is extracted from a gradient magnitude image, a part in which the difference among the features is larger than the difference between regions obtained from a general intensity image can be extracted.

FIG. 8 is a diagram illustrating gradient-direction rectangular feature value C according to a third example.

Gradient-direction rectangular feature value C uses a difference among the rectangular features of the gradient magnitude images of the gradient directions by employing the Haar-like feature value.

Gradient-direction rectangular feature value C is a technique for understanding the gradient relationships between adjacent regions, and two regions (a white region and a black region) adjacent to each other are different from each other in the shape or the size thereof. Gradient-direction rectangular feature value C is used to calculate a difference among the features in the same direction.

In the example shown in FIG. 8, an image 341-1 of a window of direction 1, an image 341-2 of a window of direction 2, . . . , and an image 341-N of a window of direction N are shown for multiple (N) gradient directions. In this example, the shape or the number of rectangles may differ depending on the gradient directions.

Gradient-direction rectangular feature value C is similar to Gradient-direction rectangular feature value B shown in Part (A) of FIG. 7, Part (B) of FIG. 7, and Part (C) of FIG. 7, but more appropriate extraction can be performed, for example, even when the gradient area ratios of the adjacent regions are different.

FIG. 9 is a diagram illustrating gradient-direction rectangular feature value D according to a fourth example.

Gradient-direction rectangular feature value D uses a difference among multiple rectangular features in gradient-magnitude image over different gradient directions.

Gradient-direction rectangular feature value D is a technique for understanding the gradient relationships of separated regions, and two regions (a white region and a black region) separated from each other may be equal to or different from each other in the shape or the size thereof. Gradient-direction rectangular feature value D is used to calculate a difference among the features in the same direction.

In the example shown in FIG. 9, an image 351-1 of a window of direction 1, an image 351-2 of a window of direction 2, . . . , and an image 351-N of a window of direction N are shown for multiple (N) gradient directions. In this example, the shape or the number of rectangles may differ depending on the gradient directions.

Gradient-direction rectangular feature value D allows extraction of features from non-adjacent regions. Gradient-direction rectangular feature value D facilitates easy understanding that a gradient in a certain direction of a target object is present between separated parts.

FIG. 10 is a diagram illustrating gradient-direction rectangular feature value E according to a fifth example.

Gradient-direction rectangular feature value E uses a difference among multiple rectangular features in gradient-magnitude image over different gradient directions.

Gradient-direction rectangular feature value E is a technique for understanding the gradient relationships of the regions of gradient magnitude images of different gradient directions, and two regions (a white region and a black region) may be equal to or different from each other in the shape or the size or the position thereof. Gradient-direction rectangular feature value E is used to calculate a difference among the features in the different directions.

In the example shown in FIG. 10, an image 361-1 of a window of direction 1, an image 361-2 of a window of direction 2, . . . , and an image 361-N of a window of direction N are shown for plural (N) gradient directions. In this example, the shape or the number of rectangles may differ depending on the gradient directions.

Since gradient-direction rectangular feature value E uses the feature relationships of multiple rectangles in gradient magnitude images of different gradient directions, it is possible to understand the relationship between different gradient directions.

In gradient-direction rectangular feature values B to E, the optimal feature values can be used (or selected or the like) using one or more of four arithmetic operations as well as the difference between regions in calculation of the difference among the multiple rectangular features. The absolute value of the difference may be used as the difference value (difference).

In calculation of the difference among the multiple rectangular features, the multiple rectangles are not limited to two rectangles, but may employ three or more rectangles.

As described above, any one or a combination of two or more of the multiple kinds of gradient-direction rectangular feature values A to E can be used in this embodiment. Accordingly, the features of a target object can be understand with a smaller number of classifiers (weak classifiers in this embodiment), thereby simplifying the configuration of the device.

Advantages obtained by using the gradient-direction rectangular feature value will be described in more detail below.

In this embodiment, the gradient-direction rectangular feature values are classified with classifiers based on real AdaBoost in the process of step S4 show in FIG. 2.

In this case, when the gradient-direction rectangular feature value and the real AdaBoost classifiers are combined, for example, an object recognition algorithm having performance with a low non-detection ratio and performance with a low error detection ratio can be constructed, for example, even under the conditions that the number of weak classifiers is very small.

In a preferable specific example, a rectangular region (that is, the size) in the window in each gradient direction for the gradient-direction rectangular feature value is not particularly limited, weak classifiers representing features of a target object are selected through learning using a classifier (the real AdaBoost classifier in this embodiment) regardless of the sizes of parts of the target object.

Accordingly, a particularly-significant part can be selected from various gradient-direction rectangular features of the target object and thus a classifier can be constructed with a small number of weak classifiers. Accordingly, the number of calculations and the number of accesses to a memory are small and thus it is possible to narrow a window in which a target object is present or to classify a target object with a short calculation processing time.

In classification using the classifier, the non detection ratio means a ratio at which a target object cannot be detected (sensed) as a target object, and the error detection ratio means a ratio at which a thing other than a target object is recognized and detected as a target object.

In this embodiment, the real AdaBoost is described as an example of boosting, but the same advantages can be obtained using extensive boosting.

FIG. 11 is a diagram illustrating a specific example of a gradient-direction rectangular feature value.

FIG. 11 shows an image (average gradient image) 401 obtained by averaging (combining) multiple learned gradient magnitude images in all of eight gradient directions (direction 1 to direction 8) and a window image 411-1 averaged only in direction 1, a window image 411-2 averaged only in direction 2, . . . , and a window image 411-8 averaged only in direction 8.

In this example, it is assumed that a rear surface of a vehicle is used as a target object. The average gradient image provides an effect allowing visual understanding of a shape of a target object based on the gradient.

In the example shown in FIG. 11, feature values (1) to (5) are used as follows.

(1) A feature value obtained using one of gradient rectangular filters (rectangles in the windows shown in FIG. 11) is used as gradient-direction rectangular feature value A.

(2) A feature value obtained using subtraction (difference) as a difference value between multiple rectangular features is used as gradient-direction rectangular feature value B.

(3) A feature value obtained using subtraction (difference) as a difference value between multiple rectangular features is used as gradient-direction rectangular feature value C.

(4) A feature value obtained using subtraction (difference) as a difference value between multiple rectangular features is used as gradient-direction rectangular feature value D.

(5) A feature value obtained using subtraction (difference) as a difference value between multiple rectangular features is used as gradient-direction rectangular feature value E.

In the example shown in FIG. 11, i (where i=1, 2, . . . , 8) in $W_{i\text{-}rj}$ represents the direction number and j (where j=1, 2, . . . ,) represents the rectangle number in each window. $W_{r\text{-}rj}$ represents the feature value per unit area of a j-th rectangle in the window of direction i.

In this example, gradient-direction rectangular feature values B to E represent the relationships in which the feature values strongly appear when subtraction (difference) is used as the difference value.

FIG. 12 is a diagram illustrating a specific example of a gradient-direction rectangular feature value.

FIG. 12 shows a window image 421-1 averaged only in direction 1, a window image 421-2 averaged only in direction 2, . . . , and a window image 421-8 averaged only in direction 8.

In this example, similarly to the example shown in FIG. 11, it is assumed that a rear surface of a vehicle is used as a target object.

In the example shown in FIG. 12, feature values (3) to (5) are used as follows.

(3) A feature value obtained using addition (sum) as a difference value between multiple rectangular features is used as gradient-direction rectangular feature value C.

(4) A feature value obtained using addition (sum) as a difference value between multiple rectangular features is used as gradient-direction rectangular feature value D.

(5) A feature value obtained using addition (sum) as a difference value between multiple rectangular features is used as gradient-direction rectangular feature value E.

In the example shown in FIG. 12, i (where i=1, 2, . . . , 8) in $W_{i\text{-}rj}$ represents the direction number and j (where j=1, 2, . . . ,) represents the rectangle number in each window. $W_{i\text{-}rj}$ represents the feature value per unit area of a j-th rectangle in the window of direction i.

In this example, gradient-direction rectangular feature values C to E represent the relationships in which the feature values strongly appear when addition (sum) is used as the difference value. A feature defined by no gradient magnitude may be used. As described in the example shown in FIG. 11 and the example shown in FIG. 12, the feature values can be made to strongly appear by the use of four arithmetic operations. Normalization of an illumination difference of the gradient-direction rectangular feature value will be described below.

In order to correct an illumination difference for a target object, for example, the illumination difference can be normalized by the use of the standard deviation of intensity images based on a window size. This normalization is described, for example, in Non-patent Document 1.

In this case, integral images of intensities and integral images of intensity squares are separately calculated.

In another technique, as shown in Part (A) of FIG. 13 and Part (B) of FIG. 13, a technique of calculating the average or the standard deviation of the gradient magnitudes of the gradient directions in the window size and normalizing the gradient-direction rectangular features with any calculated value may be used at the time of scanning with a window to correct an illumination difference for a target object.

Part (A) of FIG. 13 is a diagram illustrating an example of a normalization coefficient of the illumination difference of the gradient-direction rectangular feature values.

In this example, the illumination difference is normalized in the unit of windows.

An integral gradient image X is an image obtained by adding an integral gradient image 501-1 of direction 1, an integral gradient image 501-2 of direction 2, . . . , and an integral gradient image 501-N of direction N which are integral gradient images of multiple (N) directions and is an integral gradient image 511 integrated in all the gradient directions.

Here, $XW_n$ represents an average value per pixel in the unit of window of direction n (where n represents the direction number) in the integral gradient image.

XW represents an average value per pixel in the unit of window of all the gradient directions in the integral gradient image.

QW represents an average value per pixel in the unit of window of strong-direction gradients (the longitudinal gradient and the transverse gradient in this embodiment) in the integral gradient image.

In this example, a coefficient (illumination difference coefficient 1) for normalizing the illumination difference using an average value is described.

In a first example of illumination difference coefficient 1, a normalization coefficient XW is expressed by Equation (5). In this case, values obtained by dividing the gradient-direction rectangular feature values by the normalization coefficient XW are used.

$$XW = \sum_{n=1}^{N} XW_n \qquad (5)$$

In a second example of illumination difference coefficient 1, a normalization coefficient QW is expressed by Equation (6). In this case, values obtained by dividing the gradient-direction rectangular feature values by the normalization coefficient QW are used.

In this manner, only the directions (for example, the longitudinal gradient and the transverse gradient in a vehicle) in which the features of a target object strongly appear may be used to calculate the coefficient value, thereby saving the calculation time.

In this example, it is assumed regarding the strong-direction gradient that the longitudinal gradient is present in direction 1 and the transverse gradient is present in direction 5, but other configurations may be used. The strong direction may be set manually by a user or may be set based on a predetermined condition such as determining a direction in which the feature value is greater than or equal to a predetermined threshold value as a strong direction.

$$QW = XW_1 + XW_5 \qquad (6)$$

Part (B) of FIG. 13 is a diagram illustrating another example of a normalization coefficient of the illumination difference of the gradient-direction rectangular feature values.

In this example, the illumination difference is normalized in the unit of windows.

An integral gradient square image $X^2$ is an image obtained by adding an integral gradient square image 521-1 of direction 1, an integral gradient square image 521-2 of direction 2, . . . , and an integral gradient square image 521-N of direction N which are integral gradient square images of multiple (N) directions and is an integral gradient square image 531 integrated in all the gradient directions.

Here, $X2W_n$ represents an average value per pixel in the unit of window of direction n (where n represents the direction number) in the integral gradient square image.

X2W represents an average value per pixel in the unit of window of all the gradient directions in the integral gradient square image.

Q2W represents an average value per pixel in the unit of window of strong-direction gradients (the longitudinal gradient and the transverse gradient in this embodiment) in the integral gradient square image.

These relationships are the same as in Equation (5) and Equation (6) related to Part (A) of FIG. 13.

In this example, a coefficient (illumination difference coefficient 2) for normalizing the illumination difference using a standard deviation value is described.

In a first example of illumination difference coefficient 2, a normalization coefficient XS is expressed by Equation (7). In this case, values obtained by dividing the gradient-direction rectangular feature values by the normalization coefficient XS are used.

$$XS = \sqrt{|(XW)^2 - X2W|} \qquad (7)$$

In a second example of illumination difference coefficient 2, a normalization coefficient QS is expressed by Equation (8). In this case, values obtained by dividing the gradient-direction rectangular feature values by the normalization coefficient QS are used.

In this manner, only the directions (for example, the longitudinal gradient and the transverse gradient in a vehicle) in which the features of a target object strongly appear may be used to calculate the coefficient value, thereby saving the calculation time.

In this example, it is assumed regarding the strong-direction gradient that the longitudinal gradient is present in direction 1 and the transverse gradient is present in direction 5, but other configurations may be used. The strong direction may be set manually by a user or may be set based on a predetermined condition such as determining a direction in which the feature value is greater than or equal to a predetermined threshold value as a strong direction.

$$QS = \sqrt{|(QW)^2 - Q2W|} \qquad (8)$$

When the illumination difference is normalized using the standard deviation value in this manner, for example, an image (gradient square image) having the square value of the gradient magnitude at each pixel position is calculated in advance and the integral gradient square image is obtained by integrating the gradient square images.

FIG. 14 is a diagram illustrating another example of the normalization coefficient of the illumination difference of gradient-direction rectangular feature values.

FIG. 14 shows a captured image region 601, a raster scan region 611 set therein, and a window (a window region) 621 set therein.

The illumination difference may be normalized in the unit of the raster scan region 611.

Specifically, the normalization coefficient of the illumination difference may be calculated using an average value in the unit of the raster scan region instead of calculating the normalization coefficient of the illumination difference using the average value in the unit of the window described with reference to Part (A) of FIG. 13.

The normalization coefficient of the illumination difference may be calculated using a standard deviation in the unit of the raster scan region instead of calculating the normalization coefficient of the illumination difference using the standard deviation in the unit of the window described with reference to Part (B) of FIG. 13.

In order to correct the illumination differences of the entire image, various techniques for improving robust characteristics may be used in addition to the technique of calculating the normalization coefficient in the raster scan region.

An example of real AdaBoost will be described with reference to FIG. 15.

For the purpose of convenient explanation, (Process 1) to (Process 7) performed by the object recognition unit 13 will be described.

An image 701 is used as an example. In this embodiment, an integral gradient image can be used as the image 701.

(Process 1)

A window 711 set in a raster scan region set in the image 701 is used as an example.

In the process 721 of calculating a feature value of the window 711, a gradient-direction rectangular feature value is calculated from the detection window 711. In this example, a normalized feature value is calculated.

In this example, all features of which the feature dimension (index No.) is from 1 to M (M is an integer equal to or larger than 281 in this example) are calculated, but necessary features (for example, features included in a dictionary through previous learning) are calculated in the actual process.

(Process 2)

A process 722 of picking up a feature value of a designated feature dimension from the dictionary is performed.

Information on the result of previous learning is stored in the dictionary.

(Process 3)

A process 723 of quantizing the feature value is performed.

In this example, the quantization number (the number of BINs) is set to 64. In order to quantize the normalized feature values having a real value of 0.0 to 1.0 into 0 to 63, the product of the normalized feature values by 64 which is the number of BINs is calculated.

(Process 4)

A process 724 of referring to a probability density function table is performed.

Specifically, a POS (positive) probability and a NEG (negative) probability of each calculated feature value are obtained from the probability density function (previous probabilities) corresponding to the dictionary prepared through previous learning.

(Process 5)

A process 725 of calculating a response value h of a weak classifier is performed.

Specifically, the value of h expressed by Equation (9) is calculated as the output value of the weak classifier. In Equation (9), ϵ represents a constant.

For example, in the first weak classifier shown in FIG. 15, since the POS probability is higher than the NEG probability, h has a positive value.

$$h = 0.5 \times \log((pdf[\text{POS}]+\epsilon)/(pdf[\text{NEG}]+\epsilon)) \quad (9)$$

(Process 6)

A process 726 of repeated performance of (Process 2) to (Process 5) is carried out arbitrary times. This repetition number corresponds to the number of weak classifiers.

(Process 7)

A process 727 of calculating the sum (linear sum) of the calculated response values h of the weak classifiers and calculating the sum value as the response value H of a strong classifier is performed.

When it is determined that the calculated response value H of the strong classifier is larger than a predetermined threshold value TH, it is determined that the corresponding object is True (recognition target). Otherwise, it is determined that the corresponding object is not False (non-recognition target).

Here, any value may be used as the threshold value TH and, for example, a fixed value is set in advance.

A classifier prepared through ensemble learning such as boosting can be applied as the classifier, in addition to the real AdaBoost classifier.

Normalization of a gradient-direction rectangular feature value range will be described below with reference to Part (A) of FIG. 16, Part (B) of FIG. 16, and Part (C) of FIG. 16.

In general, in the classifier based on boosting, it is necessary to normalize the input feature values into 0 to 1.

The real AdaBoost described with reference to FIG. 15 is of a type of preparing a probability density function and normalizes the feature values input to the probability density function into 0 to 1. Generally, when a dense probability density function between 0 to 1 is prepared, it can be prepared by increasing the number of BINs, but there is a problem in that the memory capacity increases.

Therefore, in this embodiment, the gradient-direction rectangular feature values are normalized so that a range of 0 to 1 is disposed in a specific range of a dynamic range (for example, a probability density function of improving the detection ratio is prepared in case of the real AdaBoost).

In this embodiment, the dynamic range is 360.6 in case of a single rectangle (single region) and is ±360.6 in case of two rectangles (two regions).

The specific range in the dynamic range can be set, for example, using values obtained through experiments or may be set by determining the optimal coefficients (the offset values shown in Part (B) of FIG. 16 and Part (C) of FIG. 16) through learning.

Part (A) of FIG. 16 shows an input image 801 and a gradient magnitude image 802 obtained by calculating the gradient magnitudes in eight gradient directions from the input image 801.

When the input image 801 has a range per pixel of 0 to 255 and a maximum value per pixel of 255, the maximum value per pixel in the gradient magnitude image 802 is 360.6 (strictly, about 360.6), as expressed by Equation (10).

$$\sqrt{255^2 + 255^2} \approx 360.6 \quad (10)$$

Part (B) of FIG. 16 shows an example of the feature of a single-rectangle 811.

In the single-rectangle 811, the average value of the feature values at all the pixel positions in the single-rectangle 811 is set as the gradient-direction rectangular feature value and the dynamic range of the feature value (the gradient-direction rectangular feature value) f is from the minimum value 0 to the maximum value 360.6.

The relationship among the feature value f, the normalization coefficient offset, and the normalized feature value f_norm is expressed by Equation (11).

$$f\_\text{norm} = f/\text{offset} \quad (11)$$

Part (C) of FIG. 16 shows an example of the feature of a two-rectangle 812.

In the two-rectangle 812, the difference from the average value of the feature values at all the pixel positions in each rectangle is set as the gradient-direction rectangular feature value and the dynamic range of the feature value (the gradient-direction rectangular feature value) f is from the minimum value −360.6 to the maximum value +360.6.

The relationship among the feature value f, the normalization coefficient offset, and the normalized feature value f_norm is expressed by Equation (12).

$$f\_\text{norm} = (f+\text{offset})/(2\text{offset}) \quad (12)$$

Comparison of the gradient-direction rectangular feature value and the HOG feature value will be described below with reference to Part (A) of FIG. 17 and Part (B) of FIG. 17.

In this example, in an image in which a vehicle appears, the gradient-direction rectangular feature values A and B shown in FIGS. 6 and 7 are compared with the feature value selected through the real AdaBoost.

Part (A) of FIG. 17 shows the gradient-direction rectangular feature value.

In the upper part of Part (A) of FIG. 17, gradient images averaged only in the gradient directions selected through the real AdaBoost out of eight directions (direction 1 to direction 8) and regions of the feature values (the gradient-direction rectangular feature values) thereof are shown (901-1 to 901-6). That is, six weak classifiers are constructed.

In the lower part of Part (A) of FIG. 17, the regions of the feature values (the gradient-direction rectangular feature values) shown in the upper part of Part (A) of FIG. 17 are shown in the average gradient image 911. This is to visually show what gradient area of a target object (vehicle) is selected.

Specifically, a left region in which a longitudinal gradient is present is selected in weak classifier 1.

A region in which a transverse gradient is present is selected in weak classifier 2.

A right region in which a longitudinal gradient is present is selected in weak classifier 3.

A region in which a longitudinal gradient is not present is selected in weak classifier 4.

A region in which a gradient difference is present in the left tire is selected in weak classifier 5.

A region in which a gradient difference is present in the right tire is selected in weak classifier 6.

In this manner, by using the gradient-direction rectangular feature values according to this embodiment, it is possible to select the optimal values as the features of regions with various sizes. Accordingly, it is possible to reduce the number of classifiers (weak classifiers in this embodiment).

Part (B) of FIG. 17 shows the HOG feature value.

In Part (B) of FIG. 17, the regions (cells) of the selected feature values (HOG feature values) are shown in the average gradient image 921.

In this manner, by using the HOG feature values, it is possible to collectively understand the features in the unit of fixed cells. Accordingly, since the number of classifiers (weak classifiers in this embodiment) is relatively large, the classifiers more than eight weak classifiers shown in Part (B) of FIG. 17 are necessary. The line marked in each selected cell in Part (B) of FIG. 17 indicates the gradient direction.

Here, a result example of a simulation of recognizing a vehicle depending on the number of weak classifiers will be described.

In the simulation result, when the number of weak classifiers learned using the gradient-direction rectangular feature values is about 4 to 16, the number of weak classifiers learned using the HOG feature values is about 100.

The processing time for each window when the gradient-direction rectangular feature values and the classifiers thereof are used is about 1/50 to 1/60 of the processing time for each window when the HOG feature values and the classifiers thereof are used.

An integral image will be described below with reference to Part (A) of FIG. 18, Part (B) of FIG. 18, and Part (C) of FIG. 18.

Part (A) of FIG. 18 is a diagram illustrating an example of an original image.

In this example, an intensity image 2001 is shown as the original image.

In the intensity image 2001, an intensity value of a pixel position (x, y) is defined as i(x, y), where the transverse (horizontal) direction is the x axis and the longitudinal (vertical) direction is the y axis.

Part (B) of FIG. 18 is a diagram illustrating an example of a result of a cumulative row addition.

In this example, integration is repeatedly performed from the left-top to the right-bottom of a frame.

In the cumulative row addition result 2002, a cumulative row addition value s(x, y) of a pixel position (x, y) is expressed by Equation (13).

$$s(x,y) = s(x,y-1) + i(x,y) \quad (13)$$

Part (C) of FIG. 18 is a diagram illustrating an example of an integral image.

In this example, integration is repeatedly performed from the left-top to the right-bottom in a frame.

In the integral image 2003, an integral value ii(x, y) of a pixel position (x, y) is expressed by Equation (14).

$$ii(x,y) = ii(x-1,y) + s(x,y) \quad (14)$$

The Haar-like feature value will be described below with reference to Part (A) of FIG. 19 and Part (B) of FIG. 19.

Part (A) of FIG. 19 shows a two-rectangle 2011.

A difference between left and right rectangular feature values is used as the feature of the two-rectangle 2011.

Part (B) of FIG. 19 shows a method of calculating the two-rectangle feature.

Here, a, b, c, d, e, and f are defined as integral gradient values at the points.

The single-rectangle feature value of the left region (region 1) is expressed by Expression (15) and can be calculated at four points.

The single-rectangle feature value of the right region (region 2) is expressed by Expression (16) and can be calculated at four points.

The two-rectangle feature value which is the difference between the feature value of region 1 and the feature value of region 2 is expressed by Equation (17) and can be calculated at six points.

$$e + a - (b + d) \quad (15)$$

$$f + b - (c + e) \quad (16)$$

$$e + a - (b + d) - (f + b - (c + e)) = a + 2e + c - 2b - f - d \quad (17)$$

The HOG feature value will be described below with reference to Part (A) of FIG. 20 and Part (B) of FIG. 20.

Part (A) of FIG. 20 shows an example of conversion into a histogram using cells.

Cells 2021 and a block 2022 including nine cells in total of 3×3 set in an image are shown.

In this example, each cell includes five pixels (5 pixels) in the transverse (horizontal) direction and five pixels (5 pixels) in the longitudinal direction (vertical direction).

An intensity gradient distribution 2023 in the unit of cells is shown for each cell 2021. In this regard, a gradient direction histogram in which the horizontal axis represents the direction and the vertical axis represents the gradient magnitude is shown with nine directions as examples.

In this example, the intensity gradients in the cells are normalized in the region in the unit of block 2022.

Part (B) of FIG. 20 shows an example where the HOG feature value normalized by the block region is calculated.

With nine directions as examples, a feature vector $F_{j,k}$ of a single cell 2031 is expressed by Equation (18). The components f of the feature vector in the directions (direction 1 to direction 9) are defined as $f_1$ to $f_9$, respectively. Here, k represents the position in the transverse (horizontal) direction of a cell and j represents the position in the longitudinal (vertical) direction.

The feature vector V of the block 2032 is expressed by Equation (19).

The normalization result v using the magnitude of the feature vector V is expressed by Equation (20).

In this example, the HOG feature vector has 9 cells×9 dimensions×4 blocks=324 dimensions.

$$F_{j,k} = [f_1, f_2, f_3, f_4, f_5, f_6, f_7, f_8, f_9] \quad (18)$$

$$V = [F_{j,k}, F_{j,k+1}, F_{j,k+2}, F_{j+1,k}, F_{j+1,k+1}, F_{j+1,k+2}, F_{j+2,k}, F_{j+2,k+1}, F_{j+2,k+2}] \quad (19)$$

$$v = \frac{f}{\sqrt{\|V\|^2 + \varepsilon^2}} \quad (\varepsilon = 1) \quad (20)$$

Description of Configuration Examples of Above-Mentioned Embodiment (Configuration Example 1) to (Configuration Example 17) of the above-mentioned image recognition systems according to this embodiment will be described below.

Configuration Example 1

The object recognition unit 13 of the image recognition system according to this embodiment calculates gradient directions and gradient magnitudes from a captured intensity image, scans a gradient magnitude image (of the integral image may be referred to as an integral histogram) of each gradient direction with a window, and recognizes a target object through pattern recognition using learned gradient-direction rectangular feature values (extraction of rectangular features from gradient values divided into the directions).

Configuration Example 2

The object recognition unit 13 of the image recognition system according to this embodiment uses a single-rectangle feature value of a gradient magnitude image as the gradient-direction rectangular feature value, as shown in FIG. 6.

Configuration Example 3

The object recognition unit 13 of the image recognition system according to this embodiment uses the Haar-like feature value of a gradient magnitude image of the gradient-direction rectangular feature value, as shown in FIG. 7.

Configuration Example 4

The object recognition unit 13 of the image recognition system according to this embodiment uses multiple features (Haar-like application) with different rectangular areas adjacent to each other in the same gradient direction of a gradient magnitude image as the gradient-direction rectangular feature value, as shown in FIG. 8.

Configuration Example 5

The object recognition unit 13 of the image recognition system according to this embodiment uses multiple features with equal (or different) rectangular areas separated in the same gradient direction of a gradient magnitude image as the gradient-direction rectangular feature value, as shown in FIG. 9.

Configuration Example 6

The object recognition unit 13 of the image recognition system according to this embodiment uses multiple features with equal (or different) rectangular areas separated in the different gradient directions of a gradient magnitude image as the gradient-direction rectangular feature value, as shown in FIG. 10.

Configuration Example 7

The object recognition unit 13 of the image recognition system according to this embodiment applies any operation of four arithmetic operations to the gradient-direction rectangular feature values when relationships of multiple gradient rectangles are used as feature values.

Configuration Example 8

The object recognition unit 13 of the image recognition system according to this embodiment uses a combination of two or all of (Configuration Example 2) to (Configuration Example 7) as the gradient-direction rectangular feature value.

Configuration Example 9

The object recognition unit 13 of the image recognition system according to this embodiment uses a gradient average value in the unit of windows as the gradient-direction rectangular feature value to perform normalization based on an illumination difference, as shown in Part (A) of FIG. 13.

Configuration Example 10

The object recognition unit 13 of the image recognition system according to this embodiment uses a gradient standard deviation value in the unit of windows as the gradient-direction rectangular feature value to perform normalization based on an illumination difference, as shown in Part (B) of FIG. 13.

Configuration Example 11

The object recognition unit 13 of the image recognition system according to this embodiment uses a gradient average value in the unit of raster scan region s as the gradient-direction rectangular feature value to perform normalization based on an illumination difference, as shown in FIG. 14.

Configuration Example 12

The object recognition unit 13 of the image recognition system according to this embodiment uses a gradient standard deviation value in the unit of raster scan region s as the gradient-direction rectangular feature value to perform normalization based on an illumination difference, as shown in FIG. 14.

Configuration Example 13

The object recognition unit 13 of the image recognition system according to this embodiment selects a weak classifier as a classifier through learning of gradient rectangular features and uses the selected weak classifier for recognition.

For example, the feature values described in (Configuration Example 1) to (Configuration Example 12) are used as the gradient-direction rectangular feature value.

Configuration Example 14

The object recognition unit 13 of the image recognition system according to this embodiment creates the classifier through ensemble learning such as boosting.

Configuration Example 15

The object recognition unit 13 of the image recognition system according to this embodiment uses an AdaBoost classifier or a real AdaBoost classifier as the classifier.

Configuration Example 16

The object recognition unit 13 of the image recognition system according to this embodiment uses a coefficient for normalizing range of feature values to select the optimal weak classifier as the classifier, as shown in Part (A) of FIG. 16, Part (B) of FIG. 16, and Part (C) of FIG. 16.

Configuration Example 17

In the object recognition unit 13 of the image recognition system according to this embodiment, the coefficients (coefficients for normalizing the range of feature values) are values simultaneously learned when creating the classifier through learning.

As described above, the object recognition unit 13 of the image recognition system according to this embodiment can improve image recognition efficiency.

By employing the object recognition unit 13 of the image recognition system according to this embodiment, for example, it is possible to construct a small number of weak classifiers and to reduce the operation processing time.

By employing the object recognition unit 13 of the image recognition system according to this embodiment, for example, it is possible to mount (install) the image recognition system on (in) an on-board system.

In this manner, by employing the object recognition unit 13 of the image recognition system according to this embodiment, for example, since the operation processing speed is obtained enough to mount (install) the image recognition system on (in) an on-board system while maintaining identification performance, an adaptive cruise control (ACC) system, a forward collision warning (FCW) system, a pedestrian collision warning system, and the like can be applied using a single device.

According to this embodiment, it is possible to provide a device, a method, and a computer program which are suitable for recognizing a target object.

Summary of Above-Mentioned Embodiment

The above-mentioned embodiment describes the configuration in which a device or a system including the object recognition unit 13 shown in FIG. 1 is provided to a vehicle for vehicle mounting, but the device or system may be provided to any moving object as other examples.

It is described in the above-mentioned embodiment that the rear surface of a vehicle is used as a specific example of a target object, but may be applied to recognition of other target objects such as a side surface of a vehicle, a motorbike, a pedestrian, a passenger in the interior, or a face thereof.

Regarding the gradient-direction rectangular feature values, the technique of creating the gradient-direction rectangular feature values using the integral gradient image (integral histogram) based on the integral image for each gradient direction is described as an example in the above-mentioned embodiment, but the integral gradient image (integral histogram) may not be used necessarily. Other techniques such as a technique of selecting a direction for each pixel (1 pixel) in the unit of cells may be used as another configuration example.

Programs for realizing the functions of the processes that are performed by any of the constructive units shown in FIG. 1 may be recorded on a computer-readable recording medium and the programs recorded on the recording medium may be read and executed by a computer system to perform the processes. The "computer system" includes an OS (Operating System) and hardware such as peripherals. The "computer system" also includes a WWW system having a homepage provision environment (or display environment). The "computer-readable recording medium" includes a portable medium such as a flexible disc, a magneto-optical disc, a ROM, or a CD-ROM or a storage device such as a hard disk built in the computer system. The "computer-readable recording medium" also includes a device storing a program for a predetermined time, like an internal volatile memory (RAM (Random Access Memory)) of a computer system serving as a server or a client when the programs are transmitted through a network such as the Internet or a communication line such as a telephone line.

The above programs may be transmitted from a computer system having the programs stored in a storage device thereof or the like to another computer system through a transmission medium or by carrier waves in the transmission medium. The "transmission medium" which transmits a program means a medium having a function of transmitting information and examples thereof include a network (communication network) such as the Internet and a communication link (communication line) such as a telephone line. The program may realize some of the above-described functions. The program may realize the above-described functions in combination with a program already recorded in a computer system, that is, the program may be a differential file (differential program).

In addition, not being limited to the above description, it is possible to realize the processes that are performed by any of the constructive units shown in FIG. 1 by using devices such as an FPGA (Field Program Gate Array), a DSP (Digital Signal Processor), or the like other than a micro-computer.

While the embodiments of the invention have been described with reference to the accompanying drawings, the specific constitutions are not limited to the embodiments, and may include other designs which do not depart from the concept of the invention.

What is claimed is:

1. An image recognition device comprising:
an image acquirer configured to acquire a primal image; and
an object recognizer configured:
to calculate gradient magnitude images of the primal image for plural directions,
to scan the gradient magnitude images with a window which calculates rectangular feature values within the window, and
to recognize a target object using a classifier using at least two of the rectangular feature values; wherein
at least one of the rectangular feature values is calculated based on intensity values in at least two of a first type of rectangular areas on one of the gradient magnitude images;
at least one of the rectangular feature values is calculated based on intensity values in at least two of a second type of rectangular areas on at least two of the gradient magnitude images acquired for different gradient directions of the plural directions; and
one of the at least two of the second type of rectangular areas is placed on one of the at least two of the gradient magnitude images, while another of the at least two of the second type of rectangular areas is placed on another of the at least two of the gradient magnitude images.

2. An image recognition method comprising:
acquiring a primal image;
calculating gradient magnitude images of the primal image for plural directions;
scanning the gradient magnitude images with a window which calculates rectangular feature values within the window; and
recognizing a target object using a classifier based on at least two of the rectangular feature values; wherein
at least one of the rectangular feature values is calculated based on intensity values in at least two of a first type of rectangular areas on one of the gradient magnitude images;
at least one of the rectangular feature values is calculated based on intensity values in at least two of a second type of rectangular areas on at least two of the gradient magnitude images acquired for different gradient directions of the plural directions; and
one of the at least two of the second type of rectangular areas is placed on one of the at least two of the gradient magnitude images, while another of the at least two of the second type of rectangular areas is placed on another of the at least two of the gradient magnitude images.

3. The image recognition method of claim 2, wherein the at least two of the first type of rectangular areas do not overlap or touch one another.

4. The image recognition method of claim 2, wherein the at least two of the second type of rectangular areas do not overlap or touch one another when the at least two of the second type of rectangular areas are mapped on the primal image.

5. The image recognition device of claim 3, wherein the at least two of the second type of rectangular areas do not overlap or touch one another when the at least two of the second type of rectangular areas are mapped on the primal image.

6. A non-transitory computer readable medium having instructions stored thereon, which, when executed by a computer, cause the computer to perform a method comprising:
   acquiring a primal image;
   calculating gradient magnitude images of the primal image for plural directions;
   scanning the gradient magnitude images with a window which calculates rectangular feature values in the window; and
   recognizing a target object using a classifier based on at least two of the rectangular feature values; wherein
   at least one of the rectangular feature values is calculated based on intensity values in at least two of a first type of rectangular areas on one of the gradient magnitude images;
   at least one of the rectangular feature values is calculated based on intensity values in at least two of a second type of rectangular areas on at least two of the gradient magnitude images acquired for different gradient directions of the plural directions; and
   one of the at least two of the second type of rectangular areas is placed on one of the at least two of the gradient magnitude images, while another of the at least two of the second type of rectangular areas is placed on another of the at least two of the gradient magnitude images.

* * * * *